(12) United States Patent  
Limaye et al.

(10) Patent No.: US 11,188,887 B1
(45) Date of Patent: Nov. 30, 2021

(54) SYSTEMS AND METHODS FOR PAYMENT INFORMATION ACCESS MANAGEMENT

(71) Applicant: Wells Fargo Bank, N.A., San Francisco, CA (US)

(72) Inventors: Ajit Limaye, Portland, OR (US); Andrew L. Martinez, San Francisco, CA (US); Darius A. Miranda, San Francisco, CA (US); Bipin M. Sahni, Pleasanton, CA (US); Christy Wang, San Francisco, CA (US); Garrett S. Weiss, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/195,600

(22) Filed: Nov. 19, 2018

Related U.S. Application Data

(60) Provisional application No. 62/588,756, filed on Nov. 20, 2017.

(51) Int. Cl.
*G06Q 40/00* (2012.01)
*G06Q 20/08* (2012.01)
*G06Q 20/38* (2012.01)

(52) U.S. Cl.
CPC ....... *G06Q 20/0855* (2013.01); *G06Q 20/385* (2013.01)

(58) Field of Classification Search
CPC .................................. G07F 19/00; G07C 9/00
(Continued)

(56) References Cited

U.S. PATENT DOCUMENTS 5,485,510 A    1/1996  Colbert
5,573,457 A   11/1996  Watts et al.
(Continued)

FOREIGN PATENT DOCUMENTS

GB      2 441 156       2/2008
KR     20160015375      2/2016
(Continued)

OTHER PUBLICATIONS

IEEE Xplore; 2009 First Asian Himalayas International Conference on Internet: Emergence of Payment Systems in the age of Elcetronic Commerce.; The state off Art. Author S Singh Nov. 1, 2009 pp. 1-18 (Year: 2009).*
(Continued)

*Primary Examiner* — Bruce I Ebersman
*Assistant Examiner* — John A Anderson
(74) *Attorney, Agent, or Firm* — Foley & Lardner LLP

(57) ABSTRACT

A computer-implemented method performed by a computing system includes gathering payment history data for a payment account, held by a customer with an accounts provider, by at least one of data mining the payment history data from a database associated with the accounts provider or screen scraping the payment history data, wherein the payment account is associated with payment information. The method also includes identifying a subset of the payment history data that relates to online payments, analyzing the subset of the payment history data to identify characteristics of the online payments made from the payment account, and, based on the characteristics, determining one or more third parties that are likely storing the payment information. The method further includes displaying a list of the one or more third parties to the customer.

11 Claims, 10 Drawing Sheets

(58) Field of Classification Search
USPC .......................................................... 705/39
See application file for complete search history.

(56) References Cited

U.S. PATENT DOCUMENTS

| | | | |
|---|---|---|---|
| 5,737,423 | A | 4/1998 | Manduley |
| 5,999,978 | A | 12/1999 | Angal et al. |
| 6,047,268 | A | 4/2000 | Bartoli et al. |
| 6,105,006 | A | 8/2000 | Davis et al. |
| 6,188,309 | B1 | 2/2001 | Levine |
| 6,193,152 | B1 | 2/2001 | Fernando et al. |
| 6,408,330 | B1 | 6/2002 | Delahuerga |
| 6,422,462 | B1 | 7/2002 | Cohen |
| 6,494,367 | B1 | 12/2002 | Zacharias |
| 6,575,361 | B1 | 6/2003 | Graves et al. |
| 6,717,592 | B2 | 4/2004 | Gusler et al. |
| 6,845,906 | B2 | 1/2005 | Royer et al. |
| 6,865,547 | B1 | 3/2005 | Brake, Jr. et al. |
| 6,879,965 | B2 | 4/2005 | Fung et al. |
| 6,910,021 | B2 | 6/2005 | Brown et al. |
| 6,980,969 | B1 | 12/2005 | Tuchler et al. |
| 7,014,107 | B2 | 3/2006 | Singer et al. |
| 7,016,877 | B1 | 3/2006 | Steele et al. |
| 7,107,243 | B1 | 9/2006 | McDonald et al. |
| 7,219,833 | B2 | 5/2007 | Cantini et al. |
| 7,225,156 | B2 | 5/2007 | Fisher et al. |
| 7,249,099 | B2 | 7/2007 | Ling |
| 7,264,154 | B2 | 9/2007 | Harris |
| 7,319,986 | B2 | 1/2008 | Praisner et al. |
| 7,331,518 | B2 | 2/2008 | Rable |
| 7,347,361 | B2 | 3/2008 | Lovett |
| 7,359,880 | B2 | 4/2008 | Abel et al. |
| 7,383,988 | B2 | 6/2008 | Slonecker, Jr. |
| 7,392,224 | B1 | 6/2008 | Bauer et al. |
| 7,398,248 | B2 | 7/2008 | Phillips et al. |
| 7,451,395 | B2 | 11/2008 | Brants et al. |
| 7,512,563 | B2 | 3/2009 | Likourezos et al. |
| 7,552,088 | B2 | 6/2009 | Malcolm |
| 7,571,142 | B1 | 8/2009 | Flitcroft et al. |
| 7,587,365 | B2 | 9/2009 | Malik et al. |
| 7,653,597 | B1 | 1/2010 | Stevanovski et al. |
| 7,685,037 | B2 | 3/2010 | Reiners et al. |
| 7,689,502 | B2 | 3/2010 | Lilly et al. |
| 7,698,221 | B2 | 4/2010 | Blinn et al. |
| 7,707,082 | B1 | 4/2010 | Lapstun et al. |
| 7,712,655 | B2 | 5/2010 | Wong |
| 7,753,265 | B2 | 7/2010 | Harris |
| 7,778,932 | B2 | 8/2010 | Yan |
| 7,818,319 | B2 | 10/2010 | Henkin et al. |
| 7,873,573 | B2 | 1/2011 | Realini |
| 7,937,325 | B2 | 5/2011 | Kumar et al. |
| 7,941,534 | B2 | 5/2011 | De La Huerga |
| 7,949,572 | B2 | 5/2011 | Perrochon et al. |
| 7,954,704 | B1 | 6/2011 | Gephart et al. |
| 8,090,346 | B2 | 1/2012 | Cai |
| 8,099,109 | B2 | 1/2012 | Altman et al. |
| 8,127,982 | B1 | 3/2012 | Casey et al. |
| 8,160,933 | B2 | 4/2012 | Nguyen et al. |
| 8,175,938 | B2 | 5/2012 | Olliphant et al. |
| 8,196,131 | B1 | 6/2012 | Von Behren et al. |
| 8,245,909 | B2 | 8/2012 | Pletz et al. |
| 8,249,983 | B2 | 8/2012 | Dilip et al. |
| 8,255,323 | B1 | 8/2012 | Casey et al. |
| 8,266,031 | B2 | 9/2012 | Norris et al. |
| 8,266,205 | B2 | 9/2012 | Hammad et al. |
| 8,280,786 | B1 | 10/2012 | Weiss et al. |
| 8,280,788 | B2 | 10/2012 | Perlman |
| 8,296,228 | B1 | 10/2012 | Kloor |
| 8,297,502 | B1 | 10/2012 | McGhie et al. |
| 8,301,566 | B2 | 10/2012 | Mears |
| 8,332,294 | B1 | 12/2012 | Thearling |
| 8,359,531 | B2 | 1/2013 | Grandison et al. |
| 8,360,952 | B2 | 1/2013 | Wissman et al. |
| 8,364,556 | B2 | 1/2013 | Nguyen et al. |
| 8,396,808 | B2 | 3/2013 | Greenspan |
| 8,407,136 | B2 | 3/2013 | Bard et al. |
| 8,407,142 | B1 | 3/2013 | Griggs |
| 8,423,349 | B1 | 4/2013 | Huynh et al. |
| 8,473,394 | B2 | 6/2013 | Marshall |
| 8,489,894 | B2 | 7/2013 | Comrie et al. |
| 8,543,506 | B2 | 9/2013 | Grandcolas et al. |
| 8,589,335 | B2 | 11/2013 | Smith et al. |
| 8,595,074 | B2 | 11/2013 | Sharma et al. |
| 8,595,098 | B2 | 11/2013 | Starai et al. |
| 8,625,838 | B2 | 1/2014 | Song et al. |
| 8,630,952 | B2 | 1/2014 | Menon |
| 8,635,687 | B2 | 1/2014 | Binder |
| 8,655,310 | B1 | 2/2014 | Katzer et al. |
| 8,655,719 | B1 | 2/2014 | Li et al. |
| 8,660,926 | B1 | 2/2014 | Wehunt et al. |
| 8,682,753 | B2 | 3/2014 | Kulathungam |
| 8,682,802 | B1 | 3/2014 | Kannanari |
| 8,700,729 | B2 | 4/2014 | Dua |
| 8,706,625 | B2 | 4/2014 | Vicente et al. |
| 8,712,839 | B2 | 4/2014 | Steinert et al. |
| 8,725,601 | B2 | 5/2014 | Ledbetter et al. |
| 8,762,211 | B2 | 6/2014 | Killian et al. |
| 8,762,237 | B2 | 6/2014 | Monasterio et al. |
| 8,781,957 | B2 | 7/2014 | Jackson et al. |
| 8,781,963 | B1 | 7/2014 | Feng et al. |
| 8,793,190 | B2 | 7/2014 | Johns et al. |
| 8,794,972 | B2 | 8/2014 | Lopucki |
| 8,851,369 | B2 | 10/2014 | Bishop et al. |
| 8,868,458 | B1 | 10/2014 | Starbuck et al. |
| 8,880,047 | B2 | 11/2014 | Konicek et al. |
| 8,887,997 | B2 | 11/2014 | Barret et al. |
| 8,924,288 | B1 | 12/2014 | Easley et al. |
| 8,954,839 | B2 | 2/2015 | Sharma et al. |
| 9,076,134 | B2 | 7/2015 | Grovit et al. |
| 9,105,021 | B2 | 8/2015 | Tobin |
| 9,195,984 | B1 | 11/2015 | Spector et al. |
| 9,256,871 | B2 | 2/2016 | Anderson et al. |
| 9,256,904 | B1 | 2/2016 | Haller et al. |
| 9,372,849 | B2 | 6/2016 | Gluck et al. |
| 9,390,417 | B2 | 7/2016 | Song et al. |
| 9,396,491 | B2 | 7/2016 | Isaacson et al. |
| 9,489,694 | B2 | 11/2016 | Haller et al. |
| 9,514,456 | B2 | 12/2016 | England et al. |
| 9,519,934 | B2 | 12/2016 | Calman et al. |
| 9,558,478 | B2 | 1/2017 | Zhao |
| 9,569,473 | B1 | 2/2017 | Holenstein et al. |
| 9,576,318 | B2 | 2/2017 | Caldwell |
| 9,646,300 | B1 | 5/2017 | Zhou et al. |
| 9,647,855 | B2 | 5/2017 | Deibert et al. |
| 9,690,621 | B2 | 6/2017 | Kim et al. |
| 9,699,610 | B1 | 7/2017 | Chicoine et al. |
| 9,792,636 | B2 | 10/2017 | Milne |
| 9,792,648 | B1 | 10/2017 | Haller et al. |
| 9,849,364 | B2 | 12/2017 | Tran et al. |
| 9,853,959 | B1 | 12/2017 | Kapczynski et al. |
| 9,858,576 | B2 | 1/2018 | Song et al. |
| 9,978,046 | B2 | 5/2018 | Lefebvre et al. |
| 10,032,146 | B2 | 7/2018 | Caldwell |
| 10,044,647 | B1 | 8/2018 | Karp et al. |
| 10,050,779 | B2 | 8/2018 | Alness et al. |
| 10,115,155 | B1 | 10/2018 | Haller et al. |
| 10,157,420 | B2 | 12/2018 | Narayana et al. |
| 10,187,483 | B2 | 1/2019 | Golub et al. |
| 10,275,602 | B2 | 4/2019 | Bjorn et al. |
| 10,402,817 | B1 | 9/2019 | Benkreira et al. |
| 10,402,818 | B2 | 9/2019 | Zarakas et al. |
| 10,417,396 | B2 | 9/2019 | Bawa et al. |
| 10,423,948 | B1 | 9/2019 | Wilson et al. |
| 10,460,395 | B2 | 10/2019 | Grassadonia |
| 10,521,798 | B2 | 12/2019 | Song et al. |
| 10,650,448 | B1 | 5/2020 | Haller et al. |
| 10,963,589 | B1 | 3/2021 | Fakhraie et al. |
| 2001/0001856 | A1 | 5/2001 | Gould et al. |
| 2001/0032183 | A1 | 10/2001 | Landry |
| 2001/0051920 | A1 | 12/2001 | Joao et al. |
| 2002/0016749 | A1 | 2/2002 | Borecki et al. |
| 2002/0035539 | A1 | 3/2002 | O'Connell |
| 2002/0038289 | A1 | 3/2002 | Lawlor et al. |
| 2002/0095386 | A1 | 7/2002 | Maritzen et al. |

(56) References Cited

U.S. PATENT DOCUMENTS

| | | |
|---|---|---|
| 2002/0143655 A1 | 10/2002 | Elston et al. |
| 2002/0169720 A1 | 11/2002 | Wilson et al. |
| 2003/0046246 A1 | 3/2003 | Klumpp et al. |
| 2003/0061163 A1 | 3/2003 | Durfield |
| 2003/0097331 A1 | 5/2003 | Cohen |
| 2003/0172040 A1 | 9/2003 | Kemper et al. |
| 2003/0195847 A1 | 10/2003 | Felger |
| 2003/0200179 A1 | 10/2003 | Kwan |
| 2003/0216997 A1 | 11/2003 | Cohen |
| 2003/0217001 A1 | 11/2003 | McQuaide et al. |
| 2004/0054591 A1 | 3/2004 | Spaeth et al. |
| 2004/0073903 A1 | 4/2004 | Melchione et al. |
| 2004/0078325 A1 | 4/2004 | O'Connor |
| 2004/0090825 A1 | 5/2004 | Nam et al. |
| 2004/0128243 A1 | 7/2004 | Kavanagh et al. |
| 2004/0148259 A1 | 7/2004 | Reiners et al. |
| 2004/0178907 A1 | 9/2004 | Cordoba |
| 2004/0225606 A1 | 11/2004 | Nguyen et al. |
| 2004/0263901 A1 | 12/2004 | Critelli et al. |
| 2005/0010483 A1 | 1/2005 | Ling |
| 2005/0014705 A1 | 1/2005 | Cheng et al. |
| 2005/0039041 A1 | 2/2005 | Shaw et al. |
| 2005/0060233 A1 | 3/2005 | Bonalle et al. |
| 2005/0114705 A1 | 5/2005 | Reshef et al. |
| 2005/0131815 A1 | 6/2005 | Fung et al. |
| 2005/0199714 A1 | 9/2005 | Brandt et al. |
| 2005/0224587 A1 | 10/2005 | Shin et al. |
| 2005/0228750 A1 | 10/2005 | Olliphant et al. |
| 2005/0273431 A1 | 12/2005 | Abel et al. |
| 2006/0046745 A1 | 3/2006 | Davidson |
| 2006/0059110 A1 | 3/2006 | Madhok et al. |
| 2006/0184456 A1 | 8/2006 | De Janasz |
| 2006/0202012 A1 | 9/2006 | Grano et al. |
| 2006/0235795 A1 | 10/2006 | Johnson et al. |
| 2006/0278698 A1 | 12/2006 | Lovett |
| 2007/0083463 A1 | 4/2007 | Kraft |
| 2007/0100773 A1 | 5/2007 | Wallach |
| 2007/0112673 A1 | 5/2007 | Protti |
| 2007/0123305 A1 | 5/2007 | Chen et al. |
| 2007/0143831 A1 | 6/2007 | Pearson et al. |
| 2007/0203836 A1 | 8/2007 | Dodin |
| 2007/0226086 A1 | 9/2007 | Bauman et al. |
| 2007/0255653 A1 | 11/2007 | Tumminaro et al. |
| 2007/0266257 A1 | 11/2007 | Camaisa et al. |
| 2008/0000052 A1 | 1/2008 | Hong et al. |
| 2008/0005037 A1 | 1/2008 | Hammad et al. |
| 2008/0017702 A1 | 1/2008 | Little et al. |
| 2008/0021787 A1 | 1/2008 | MacKouse |
| 2008/0029608 A1 | 2/2008 | Kellum et al. |
| 2008/0052226 A1 | 2/2008 | Agarwal et al. |
| 2008/0086398 A1 | 4/2008 | Parlotto |
| 2008/0115104 A1 | 5/2008 | Quinn |
| 2008/0149706 A1 | 6/2008 | Brown et al. |
| 2008/0154772 A1 | 6/2008 | Carlson |
| 2008/0191878 A1 | 8/2008 | Abraham |
| 2008/0208726 A1 | 8/2008 | Tsantes et al. |
| 2008/0229383 A1 | 9/2008 | Buss et al. |
| 2008/0244724 A1 | 10/2008 | Choe et al. |
| 2008/0260119 A1 | 10/2008 | Marathe et al. |
| 2008/0283590 A1 | 11/2008 | Oder et al. |
| 2008/0301043 A1 | 12/2008 | Unbehagen |
| 2009/0005269 A1 | 1/2009 | Martin et al. |
| 2009/0007231 A1 | 1/2009 | Kaiser et al. |
| 2009/0055269 A1 | 2/2009 | Baron |
| 2009/0055642 A1 | 2/2009 | Myers et al. |
| 2009/0112763 A1 | 4/2009 | Scipioni et al. |
| 2009/0132351 A1 | 5/2009 | Gibson |
| 2009/0205014 A1 | 8/2009 | Doman et al. |
| 2009/0228381 A1 | 9/2009 | Mik et al. |
| 2009/0287603 A1 | 11/2009 | Lamar et al. |
| 2009/0319638 A1 | 12/2009 | Faith et al. |
| 2010/0036769 A1 | 2/2010 | Winters et al. |
| 2010/0036906 A1 | 2/2010 | Song et al. |
| 2010/0063906 A1 | 3/2010 | Nelsen et al. |
| 2010/0082487 A1 | 4/2010 | Nelsen |
| 2010/0094735 A1 | 4/2010 | Reynolds et al. |
| 2010/0100470 A1 | 4/2010 | Buchanan et al. |
| 2010/0114768 A1 | 5/2010 | Duke et al. |
| 2010/0132049 A1 | 5/2010 | Vernal et al. |
| 2010/0228671 A1 | 9/2010 | Patterson |
| 2010/0274691 A1 | 10/2010 | Hammad et al. |
| 2010/0312700 A1 | 12/2010 | Coulter et al. |
| 2011/0023129 A1 | 1/2011 | Vernal et al. |
| 2011/0035318 A1 | 2/2011 | Hargrove et al. |
| 2011/0035596 A1 | 2/2011 | Attia et al. |
| 2011/0106698 A1 | 5/2011 | Isaacson et al. |
| 2011/0176010 A1 | 7/2011 | Houjou et al. |
| 2011/0178929 A1 | 7/2011 | Durkin et al. |
| 2011/0191239 A1 | 8/2011 | Blackhurst et al. |
| 2011/0196791 A1 | 8/2011 | Dominguez |
| 2011/0202462 A1 | 8/2011 | Keenan |
| 2011/0218849 A1 | 9/2011 | Rutigliano et al. |
| 2011/0247055 A1 | 10/2011 | Guo et al. |
| 2011/0276479 A1 | 11/2011 | Thomas |
| 2011/0307826 A1 | 12/2011 | Rivera et al. |
| 2012/0030109 A1 | 2/2012 | Dooley Maley et al. |
| 2012/0041881 A1 | 2/2012 | Basu et al. |
| 2012/0046994 A1* | 2/2012 | Reisman ............ G06Q 30/0204 705/7.29 |
| 2012/0047072 A1 | 2/2012 | Larkin |
| 2012/0096534 A1 | 4/2012 | Boulos et al. |
| 2012/0101938 A1 | 4/2012 | Kasower |
| 2012/0124658 A1 | 5/2012 | Brudnicki et al. |
| 2012/0158590 A1 | 6/2012 | Salonen |
| 2012/0214577 A1 | 8/2012 | Petersen et al. |
| 2012/0227094 A1 | 9/2012 | Begen et al. |
| 2012/0239417 A1 | 9/2012 | Pourfallah et al. |
| 2012/0240235 A1 | 9/2012 | Moore |
| 2012/0254038 A1 | 10/2012 | Mullen |
| 2012/0259782 A1 | 10/2012 | Hammad |
| 2012/0265682 A1 | 10/2012 | Menon |
| 2012/0270522 A1 | 10/2012 | Laudermilch et al. |
| 2012/0296725 A1 | 11/2012 | Dessert et al. |
| 2013/0031006 A1 | 1/2013 | McCullagh et al. |
| 2013/0046690 A1 | 2/2013 | Calman et al. |
| 2013/0055378 A1 | 2/2013 | Chang et al. |
| 2013/0080219 A1 | 3/2013 | Royyuru et al. |
| 2013/0091452 A1 | 4/2013 | Sorden et al. |
| 2013/0103391 A1 | 4/2013 | Millmore et al. |
| 2013/0117696 A1 | 5/2013 | Robertson et al. |
| 2013/0132854 A1 | 5/2013 | Raleigh et al. |
| 2013/0151405 A1 | 6/2013 | Head et al. |
| 2013/0173402 A1 | 7/2013 | Young et al. |
| 2013/0174244 A1 | 7/2013 | Taveau et al. |
| 2013/0218758 A1 | 8/2013 | Koenigsbrueck et al. |
| 2013/0226813 A1 | 8/2013 | Voltz |
| 2013/0254115 A1 | 9/2013 | Pasa et al. |
| 2013/0346302 A1 | 12/2013 | Purves et al. |
| 2013/0346306 A1 | 12/2013 | Kopp |
| 2013/0346310 A1 | 12/2013 | Burger et al. |
| 2014/0006209 A1 | 1/2014 | Groarke |
| 2014/0019352 A1 | 1/2014 | Shrivastava |
| 2014/0040144 A1 | 2/2014 | Plomske et al. |
| 2014/0053069 A1 | 2/2014 | Yan |
| 2014/0067503 A1 | 3/2014 | Ebarle Grecsek et al. |
| 2014/0067683 A1 | 3/2014 | Varadarajan |
| 2014/0076967 A1 | 3/2014 | Pushkin et al. |
| 2014/0108263 A1 | 4/2014 | Ortiz et al. |
| 2014/0114855 A1 | 4/2014 | Bajaj et al. |
| 2014/0123312 A1 | 5/2014 | Marcotte |
| 2014/0129357 A1 | 5/2014 | Goodwin |
| 2014/0129448 A1 | 5/2014 | Aiglstorfer |
| 2014/0143886 A1 | 5/2014 | Eversoll et al. |
| 2014/0149368 A1 | 5/2014 | Lee et al. |
| 2014/0172707 A1 | 6/2014 | Kuntagod et al. |
| 2014/0198054 A1 | 7/2014 | Sharma et al. |
| 2014/0200957 A1 | 7/2014 | Biggs |
| 2014/0207672 A1 | 7/2014 | Kelley |
| 2014/0237236 A1 | 8/2014 | Kalinichenko et al. |
| 2014/0248852 A1 | 9/2014 | Raleigh et al. |
| 2014/0258104 A1 | 9/2014 | Harnisch |
| 2014/0258110 A1 | 9/2014 | Davis et al. |
| 2014/0279309 A1 | 9/2014 | Cowen et al. |
| 2014/0279474 A1 | 9/2014 | Evans et al. |

(56) References Cited

U.S. PATENT DOCUMENTS

| | | |
|---|---|---|
| 2014/0306833 A1 | 10/2014 | Ricci |
| 2014/0337188 A1 | 11/2014 | Bennett et al. |
| 2014/0344149 A1 | 11/2014 | Campos |
| 2014/0344153 A1 | 11/2014 | Raj et al. |
| 2014/0344877 A1 | 11/2014 | Ohmata et al. |
| 2014/0357233 A1 | 12/2014 | Maximo et al. |
| 2014/0372308 A1 | 12/2014 | Sheets |
| 2014/0379575 A1 | 12/2014 | Rogan |
| 2015/0019944 A1 | 1/2015 | Kalgi |
| 2015/0026026 A1 | 1/2015 | Calman et al. |
| 2015/0026049 A1 | 1/2015 | Theurer et al. |
| 2015/0026057 A1 | 1/2015 | Calman et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0039457 A1 | 2/2015 | Jacobs et al. |
| 2015/0046338 A1 | 2/2015 | Laxminarayanan et al. |
| 2015/0046339 A1 | 2/2015 | Wong et al. |
| 2015/0082042 A1 | 3/2015 | Hoornaert et al. |
| 2015/0100477 A1 | 4/2015 | Salama et al. |
| 2015/0106239 A1 | 4/2015 | Gaddam et al. |
| 2015/0112870 A1 | 4/2015 | Nagasundaram et al. |
| 2015/0121500 A1 | 4/2015 | Venkatanaranappa et al. |
| 2015/0134700 A1 | 5/2015 | MacKlem et al. |
| 2015/0149357 A1 | 5/2015 | Ioannidis et al. |
| 2015/0178724 A1 | 6/2015 | Ngo et al. |
| 2015/0180836 A1 | 6/2015 | Wong et al. |
| 2015/0186856 A1 | 7/2015 | Weiss et al. |
| 2015/0193764 A1 | 7/2015 | Haggerty et al. |
| 2015/0193866 A1 | 7/2015 | Van Heerden et al. |
| 2015/0199679 A1 | 7/2015 | Palanisamy et al. |
| 2015/0199689 A1 | 7/2015 | Kumnick et al. |
| 2015/0213435 A1 | 7/2015 | Douglas et al. |
| 2015/0220999 A1 | 8/2015 | Thornton et al. |
| 2015/0221149 A1 | 8/2015 | Main et al. |
| 2015/0229622 A1 | 8/2015 | Grigg et al. |
| 2015/0248405 A1 | 9/2015 | Rudich et al. |
| 2015/0254647 A1 | 9/2015 | Bondesen et al. |
| 2015/0254655 A1 | 9/2015 | Bondesen et al. |
| 2015/0286834 A1 | 10/2015 | Ohtani et al. |
| 2015/0312038 A1 | 10/2015 | Palanisamy |
| 2015/0319158 A1 | 11/2015 | Kumnick |
| 2015/0319198 A1 | 11/2015 | Gupta et al. |
| 2015/0339663 A1 | 11/2015 | Lopreiato et al. |
| 2015/0339664 A1 | 11/2015 | Wong et al. |
| 2015/0379508 A1 | 12/2015 | Van |
| 2016/0026997 A1 | 1/2016 | Tsui et al. |
| 2016/0028550 A1 | 1/2016 | Gaddam et al. |
| 2016/0028735 A1 | 1/2016 | Francis et al. |
| 2016/0036790 A1 | 2/2016 | Shastry et al. |
| 2016/0042381 A1 | 2/2016 | Braine et al. |
| 2016/0063497 A1 | 3/2016 | Grant, IV |
| 2016/0078428 A1 | 3/2016 | Moser et al. |
| 2016/0092696 A1 | 3/2016 | Guglani et al. |
| 2016/0092870 A1 | 3/2016 | Salama et al. |
| 2016/0092872 A1 | 3/2016 | Prakash et al. |
| 2016/0092874 A1 | 3/2016 | O'Regan et al. |
| 2016/0098692 A1 | 4/2016 | Johnson et al. |
| 2016/0109954 A1 | 4/2016 | Harris et al. |
| 2016/0119296 A1 | 4/2016 | Laxminarayanan et al. |
| 2016/0125409 A1 | 5/2016 | Meredith et al. |
| 2016/0140221 A1 | 5/2016 | Park et al. |
| 2016/0155156 A1 | 6/2016 | Gopal et al. |
| 2016/0171483 A1 | 6/2016 | Luoma et al. |
| 2016/0189121 A1 | 6/2016 | Best et al. |
| 2016/0239437 A1 | 8/2016 | Le et al. |
| 2016/0260176 A1 | 9/2016 | Bernard et al. |
| 2016/0267467 A1 | 9/2016 | Rutherford et al. |
| 2016/0294879 A1 | 10/2016 | Kirsch |
| 2016/0314458 A1 | 10/2016 | Douglas et al. |
| 2016/0321669 A1 | 11/2016 | Beck et al. |
| 2016/0328522 A1 | 11/2016 | Howley |
| 2016/0358163 A1 | 12/2016 | Kumar et al. |
| 2016/0379211 A1 | 12/2016 | Hoyos et al. |
| 2017/0004506 A1 | 1/2017 | Steinman et al. |
| 2017/0011389 A1 | 1/2017 | McCandless et al. |
| 2017/0024393 A1 | 1/2017 | Choksi et al. |
| 2017/0068954 A1 | 3/2017 | Hockey et al. |
| 2017/0078299 A1 | 3/2017 | Castinado et al. |
| 2017/0078303 A1 | 3/2017 | Wu |
| 2017/0091759 A1 | 3/2017 | Selfridge et al. |
| 2017/0132633 A1 | 5/2017 | Whitehouse |
| 2017/0147631 A1 | 5/2017 | Nair et al. |
| 2017/0161724 A1 | 6/2017 | Lau |
| 2017/0249478 A1 | 8/2017 | Lovin |
| 2017/0344991 A1 | 11/2017 | Mark et al. |
| 2017/0352028 A1 | 12/2017 | Vridhachalam et al. |
| 2017/0364898 A1 | 12/2017 | Ach et al. |
| 2018/0005323 A1 | 1/2018 | Grassadonia |
| 2018/0006821 A1 | 1/2018 | Kinagi |
| 2018/0025145 A1 | 1/2018 | Morgner et al. |
| 2018/0053200 A1 | 2/2018 | Cronin et al. |
| 2018/0088909 A1 | 3/2018 | Baratta et al. |
| 2018/0158137 A1 | 6/2018 | Tsantes et al. |
| 2018/0270363 A1 | 9/2018 | Guday et al. |
| 2019/0007381 A1 | 1/2019 | Isaacson et al. |
| 2019/0171831 A1 | 6/2019 | Xin |
| 2019/0197501 A1 | 6/2019 | Senci et al. |
| 2019/0220834 A1 | 7/2019 | Moshal et al. |
| 2019/0228173 A1 | 7/2019 | Gupta et al. |
| 2019/0318122 A1 | 10/2019 | Hockey et al. |
| 2019/0333061 A1 | 10/2019 | Jackson et al. |
| 2019/0347442 A1 | 11/2019 | Marlin et al. |
| 2019/0356641 A1* | 11/2019 | Isaacson ............ G06Q 20/40 |
| 2019/0362069 A1 | 11/2019 | Park et al. |
| 2019/0370798 A1 | 12/2019 | Hu et al. |
| 2019/0392443 A1 | 12/2019 | Piparsaniya et al. |
| 2020/0005347 A1* | 1/2020 | Boal ............... G06Q 30/0207 |
| 2020/0074552 A1 | 3/2020 | Shier et al. |
| 2020/0090179 A1 | 3/2020 | Song et al. |
| 2020/0118114 A1 | 4/2020 | Benkreira et al. |
| 2020/0118133 A1 | 4/2020 | Schmidt et al. |
| 2020/0286057 A1 | 9/2020 | Desai |

FOREIGN PATENT DOCUMENTS

| | | |
|---|---|---|
| WO | WO-90/13096 A1 | 11/1990 |
| WO | WO-00/72245 | 11/2000 |
| WO | WO-03/038551 | 5/2003 |
| WO | WO-2004/081893 | 9/2004 |
| WO | WO-2004/090825 | 10/2004 |
| WO | WO-2009/151839 A1 | 12/2009 |
| WO | WO-2012/054148 | 4/2012 |
| WO | WO-2015/103443 | 7/2015 |
| WO | WO-2015/135131 A1 | 9/2015 |
| WO | WO-2018/005635 A1 | 1/2018 |

OTHER PUBLICATIONS

Microsoft, "Automatically summarize a document", 2016. 3 pages.

Cronian, Darrin "Credit card companies Freeze Spending whilst Abroad", published Jun. 9, 2007, Available at: http://www.travel-rants.com/2007/06/09/credit-card-companies-freeze-spending-whilst-abroad/.

Austin Telco Federal Credit Union, "Lost or Stolen Cards", www.atfcu.org/lost-stolen-cards.htm; Apr. 9, 2004. 6 pages.

BancFirst, "Lost Card", https://www.bancfirst.com/contact.aspx, Oct. 28, 2003. 1 page.

Eastern District of Virginia United States Bankruptcy Court, "CM/ECF Internet Credit Card Payment Guide", https://www.vaeb.uscourts.gov/wordpress/?page_id=340, Mar. 16, 2005. 12 pages.

Fort Knox Federal Credit Union, "Lost or Stolen VISA Card", http://www.fortknoxfcu.org/loststolen.html, Feb. 1, 2001. 2 pages.

Merrick Bank, "Reporting Lost or Stolen Card Help", http://www.merrickbank.com/Frequent-Asked-Questions/Report-Stolen-Card.aspx, Aug. 9, 2004. 1 page.

RBL Bank, "If Your Card is Lost or Stolen", http://www.rblbank.com/pdfs/CreditCard/FAQs.pdf, Oct. 1, 2002. 2 pages.

State Employees Credit Union, "Lost or Stolen Account Info", https://www.secumd.org/advice-planning/money-and-credit/privacy-fraud-protection/lost-or-stolen-account-info.aspx, May 20, 2005. 2 pages.

(56) References Cited

OTHER PUBLICATIONS

Union Bank & Trust, "Report Lost or Stolen Cards", http://www.ubt.com/security-fraud/report-lost-or-stolen-cards, Jul. 10, 2005. 13 pages.

Asb, "How to command your cards with ASB Card Control" Apr. 20, 2015, https://www.youtube.com/watch?v=O1sfxvVUL74 (Year: 2015).

Authorize.Net. Authorize.Net Mobile Application: iOS User Guide. Sep. 2015. Authorize.Net LLC. Ver.2.0, 1-23. https://www.authorize.net/content/dam/anet-redesign/documents/iosuserguide.pdf (Year: 2015).

Co-Op Think, Rachna Ahlawat at Co-Op Think—Evolution Sessions from THINK14, Dec. 22, 2014, 26:22 https://www.youtube.com/watch?v=yEp-qfZoPhl (Year: 2014).

Fiserv. CardValet: Mobile Application Training. Fiserv, Inc. 1-93. https://www.westernbanks.com/media/1664/ cardvalet-application.pdf (Year: 2015).

IP.com Search Query; May 5, 2020 (Year: 2020).

Konsko: "Credit Card Tokenization: Here's What You Need to Know", Credit Card Basics, Credit Card—Advertisement Nerdwallet (Year: 2014).

Notre Dame FCU "Irish Card Shield: How to Control Transaction Types" Jan. 15, 2016, 0:27, https://youtube.com/watch?v=0eZG1c6Bn38 (Year: 2016).

PCM Credit Union, "CardValet Tutorial" Jun. 24, 2015, https://www.youtube.com/watch?v=uGPh9Htw0Wc (Year: 2015).

Purchasing charges ahead. (1994). Electronic Buyers' News,, 68. Retrieved from https://dialog.proquest.com/professional/docview/681599288?accountid=131444 on Nov. 13, 2020 (Year: 1994).

\* cited by examiner

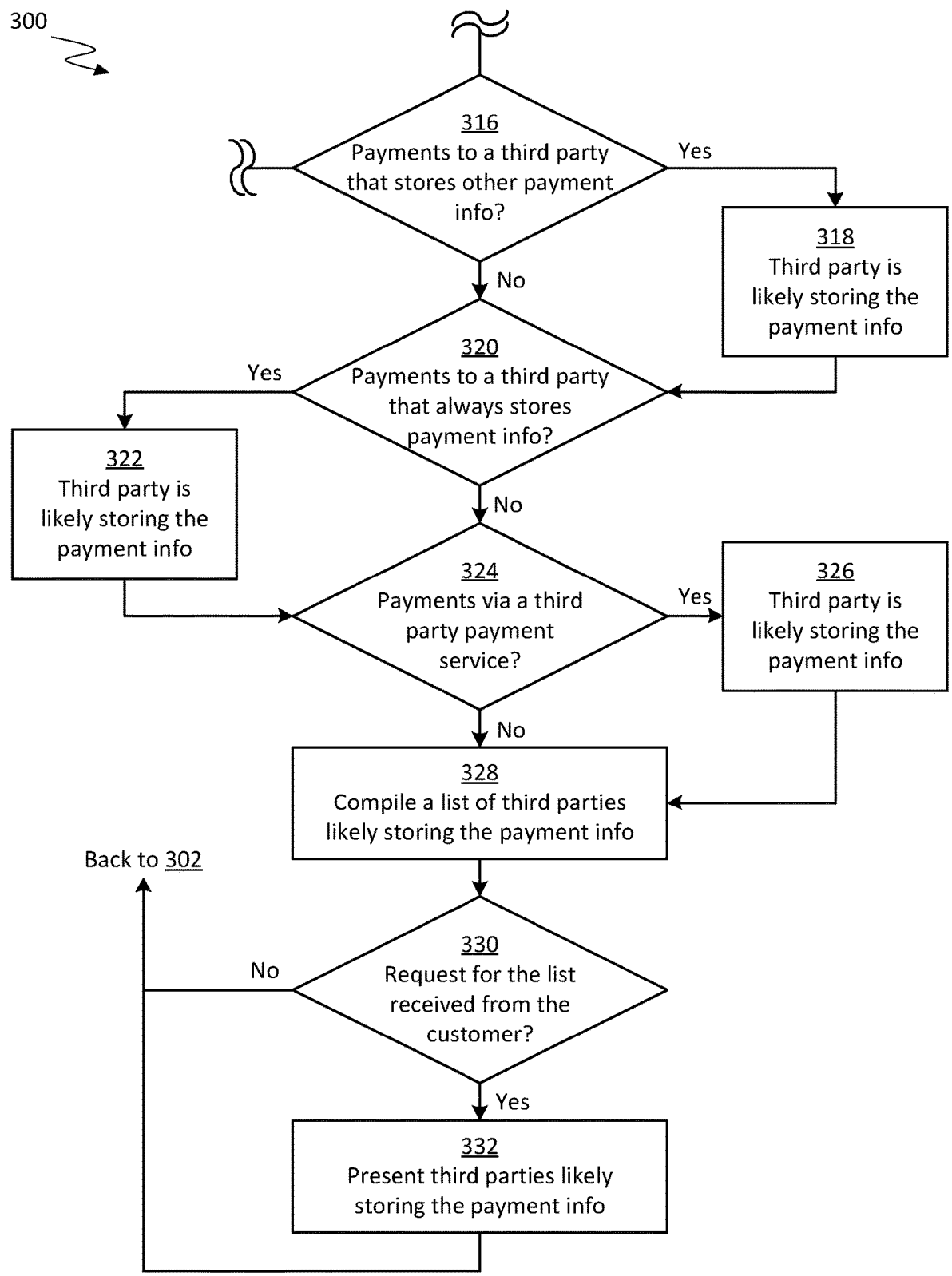

1

SYSTEMS AND METHODS FOR PAYMENT INFORMATION ACCESS MANAGEMENT

CROSS REFERENCE TO RELATED APPLICATION

This application claims priority to U.S. Provisional Patent Application No. 62/588,756 entitled "SYSTEMS AND METHODS FOR PAYMENT INFORMATION ACCESS MANAGEMENT," filed Nov. 20, 2017, and incorporated herein by reference in its entirety.

TECHNICAL FIELD

Embodiments of the present disclosure relate generally to the field of data access management.

BACKGROUND

Many online transactions involve a customer providing the customer's payment information (e.g., a credit card number, expiration date, and Card Verification Value ("CVV")) to a third party such as a merchant. The third party then uses the payment information provided by the customer to process a payment for the transaction. Additionally, in some cases, the third party stores the customer's payment information to be used in further online transactions.

SUMMARY

One embodiment relates to a computer-implemented method performed by a computing system. The method includes gathering payment history data for a payment account, held by a customer with an accounts provider, by at least one of data mining the payment history data from a database associated with the accounts provider or screen scraping the payment history data, wherein the payment account is associated with payment information. The method also includes identifying a subset of the payment history data that relates to online payments, analyzing the subset of the payment history data to identify characteristics of the online payments made from the payment account, and, based on the characteristics, determining one or more third parties that are likely storing the payment information. The method further includes displaying a list of the one or more third parties to the customer.

Another embodiment relates to a system. The system includes a network interface, an accounts database configured to store account information, and one or more processors. The one or more processors are configured for gathering payment history data for a payment account, held by a customer, with an accounts provider, by at least one of data mining the payment history from a database associated with the accounts provider or screen scraping the payment history data, wherein the payment account is associated with payment information. The one or more processors are also configured for identifying a subset of the payment history data that relates to online payments, analyzing the subset of the payment history data to identify characteristics of the online payments made from the payment account, and, based on the characteristics, determining one or more third parties that are likely storing the payment information. The one or more processors are further configured for displaying a list of the one or more third parties to the customer.

Another embodiment relates to a computer-implemented method performed by a computing system. The method includes gathering payment history data for a payment account held by a customer with an accounts provider, by at least one of data mining the payment history data from a database associated with the accounts provider or screen scraping the payment history data, wherein the payment account is associated with payment information. The method also includes identifying a subset of the payment history data that relates to online payments, analyzing the subset of the payment history data to identify characteristics of the online payments made from the payment account, and, based on the characteristics, determining one or more third parties that are likely storing the payment information. The method also includes displaying a list of the one or more third parties to the customer. The method further includes receiving, from a third party, a payment request initiated by the customer, the payment request associated with a transaction between the customer and the third party, generating a one-time use token associated with the payment account, transmitting the one-time use token to the third party, and processing a payment from the payment account to the third party using the one-time use token.

BRIEF DESCRIPTION OF THE DRAWINGS

FIGS. 3A and 3B are a flow diagram of a method of determining, and presenting to a customer, third parties that are likely storing the customer's payment information according to an example embodiment.

DETAILED DESCRIPTION

Figure 1:
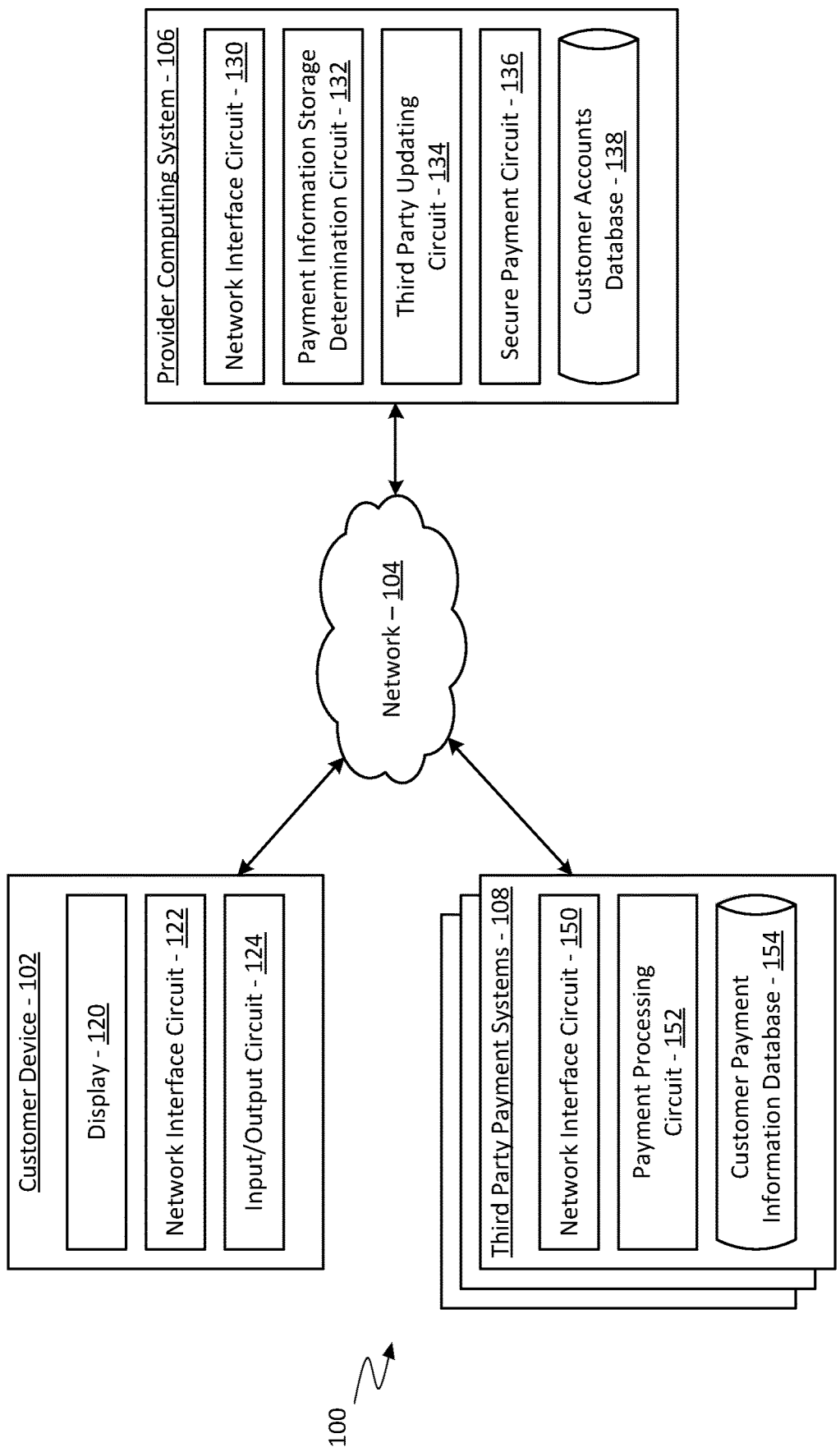
FIG. 1 is a block diagram of a system for payment information access management according to an example embodiment.

Referring to the Figures generally, various, systems, methods, and apparatuses for payment information access management are described herein. More particularly, systems and methods are described for allowing a customer to view which third parties have the customer's payment information saved and further allowing a customer to (a) update payment information with third parties and/or (b) make future payments with third parties using a secure payment system provided by the customer's payment account(s) provider.

An example implementation is described as follows. A customer holds one or more payment accounts (e.g., a demand deposit account, a credit card account, etc.) with a payment accounts provider. The provider determines third parties that likely have saved payment information relating to the customer's account(s) based on payment history data for the customer that is stored by the provider. Additionally, in some arrangements, the provider interfaces with other sources of payment histories for the customer (e.g., an online profile for the customer showing the customer's payment history with a different accounts provider with which the customer holds another payment account, a peer-to-peer payment system with which the customer has an account, etc.), gathers additional payment history data for the customer, and further determines third parties that likely have saved payment information for the customer based on the additional payment history data. The provider then provides the customer with a list of the third parties that likely have saved payment information for the customer, for example, through a web-based graphical user interface.

According to various embodiments, the provider further offers functionalities to the customer such that the customer is able to manage access to the customer's payment information by third parties. In some embodiments, the provider provides the customer with an option to use a "secure payment service" offered by the provider for making payments to third parties enrolled in the secure payment service. To use the secure payment service, the customer selects an enrolled third party and indicates to the provider that the customer would like to use the secure payment service to make future payments, using one or more of the customer's payment accounts, to the selected third party. In response, the customer or the provider notifies the selected third party that the customer has opted to use the secure payment service for the third party. Subsequently, when the customer initiates a request for a payment to be made to the third party, rather than the customer providing the third party with the customer's payment information or the third party using saved payment information for the customer to process the payment, the third party indicates to the provider that the customer has requested a payment. The provider then provides a one-time use token associated with one of the customer's payment accounts to the third party. The third party and the provider use the token to process the payment from the customer's account.

Additionally, in some embodiments, the provider provides the customer with an option to update payment information that is stored with the various third parties. For example, if the customer loses a credit card associated with a credit card account held with the provider and the provider must change the customer's credit card account number, the customer has the option to send the updated credit card number to various third parties that the provider has determined are likely storing the customer's payment information. As another example, if the customer updates the customer's billing address with the provider, the customer has the option to send the updated billing address to the various third parties. In some arrangements, the provider only updates the customer's payment information with one or more third parties the provider has determined are likely storing the customer's payment information in response to a customer request. In other arrangements, the provider automatically updates the payment information with the various third parties.

Embodiments described herein solve several technical problems. For one, while various websites, applications, programs, etc. gather a customer's payment information for purposes of processing a payment from the customer, it can be difficult for the customer to know and remember which entities have the customer's payment information saved. The customer may need to know where the customer's payment information is saved, for example, for security reasons (e.g., if data storage for a third party the customer has made purchases from in the past is compromised, the customer needs to know if the entity had the customer's payment information saved so that the customer can take steps to prevent the payment information from being used for fraudulent purposes) or because the customer needs to update the customer's stored payment information (e.g., if the customer is reissued a credit card, the customer needs to update the expiration date and CVV that are stored by various third parties so that the customer can continue to make purchases using those third parties). Accordingly, the systems and methods described herein are directed to determining which third parties likely have a customer's payment information saved. Additionally, the systems and methods described herein are directed to presenting the customer with an interface configured to present a list of these third parties. In this way, the present systems and methods allow the customer to easily view in one place the third parties that have the customer's payment information saved such that the customer can take steps, for example, to delete the customer's payment information stored with entities the customer feels are likely not storing the customer's payment information with adequate security.

Moreover, as noted above, when a customer has updated payment information, the customer must currently update the payment information individually with each entity that has the customer's payment information saved. For example, if the customer moves and changes his or her billing address, the customer is reissued a credit card with a new expiration date and CVV, or the customer loses his or her credit card and must be assigned a new credit card number, the customer must manually change the payment information on file for various entities the customer makes purchases from and risks having transactions denied until the payment information is updated. Embodiments of the systems and methods described herein are thus further configured to update the customer's payment information with the various entities storing the customer's payment information, either automatically or upon a request from the customer. This functionality, for example, removes the possibility that the customer will have a payment request denied because the entity had outdated payment information stored for the customer.

In turn, the present systems and methods improve the functioning of the various computer systems involved in processing transaction payments for the customer. For example, if the customer inadvertently submits a request for a payment to be made to a third party using outdated payment information for the customer, the payment request will ultimately be denied by the customer's provider. The same is true if the customer has a reoccurring payment set up for a third party, and a request for the reoccurring payment is made before the customer updates the customer's payment information for the reoccurring payment. In these situations, the third party's computing systems and the provider's computing systems used for payment processing end up processing unproductive transactions, which lowers the available computer bandwidth for these computing systems and requires their processors to perform unnecessary transaction processing. Accordingly, because the present systems and methods allow the customer to easily view which third parties have the customer's payment information saved and update the customer's payment information with these third parties, these unnecessary transactions are avoided, and the functionality of the computing systems involved in processing transactions for the customer is therefore increased.

Furthermore, some third parties storing the customer's payment information may not have adequate protections on their data storage such that the customer's payment information is at risk of being stolen. Alternatively, some third parties may store the customer's payment information for ease of future transactions with the customer but may wish to decrease their liability against the possibility of the payment information being stolen. Accordingly, as described above, embodiments of the present systems and methods described herein are further directed to a secure payment service that third parties and customers can opt into and thereby carry out transactions using a one-time payment token provided by the customer's accounts provider. The secure payment service described herein thus obviates the need for third parties to store the customer's payment information, thereby decreasing the likelihood that the customer's payment information will be stolen and thus decreasing the third parties' liability, while allowing transactions to be easily carried out between a customer and third parties. Further, because the secure payment service described herein allows third parties to easily carry out transactions without storing the customer's payment information, the third parties' payment processing computing systems will require less data storage capacity and security protocols, thereby increasing the functioning of these payment processing computing systems.

Referring now to FIG. 1, an embodiment of an environment 100 is depicted. In brief overview, the environment 100 includes a customer device 102 used by a customer connected to a network 104. Also connected to the network 104 are a provider computing system 106 and one or more third party payment systems 108. In reference to components of the environment 100 described herein, references to the components in singular or in plural form are not intended as disclaimers of alternative arrangements unless otherwise indicated. The components are configured to interact, in various arrangements, as described in further detail below.

In the environment 100, data communication between the customer device 102, provider computing system 106, and the one or more third party payment systems 108 is facilitated by the network 104. In some arrangements, the network includes the Internet. In other arrangements or combinations, the network 104 includes a local area network or a wide area network. The network 104 may be facilitated by short and/or long range communication technologies including Bluetooth transceivers, Bluetooth beacons, RFID transceivers, NFC transceivers, Wi-Fi transceivers, cellular transceivers, wired network connections, etc.

Still referring to FIG. 1, the customer device 102 is a computing device associated with a customer of the accounts provider that is associated with the provider computing system 106. The customer device 102 includes one or more circuits that are structured to allow the customer device 102 to exchange data over the network 104, execute software applications, access websites, generate graphical user interfaces, and perform other operations described herein. Accordingly, the customer device 102 includes any type of computing device operated by a customer in connection with services provided by a provider. For example, in various embodiments, the customer device 102 is a phone (e.g., a smartphone), a mobile computing device (e.g., a tablet computer, a laptop computer, a personal digital assistant, a portable gaming device), a stationary computing device (e.g., a desktop computer, an ATM), or a wearable computing device (e.g., a smart watch, smart glasses, a smart bracelet). In some arrangements, the customer device 102 is alternatively a computing device associated with the provider computing system 106. As an example, the customer device 102 is a computing system at a branch of the provider associated with the provider computing system 106, which the customer uses to, for example, activate the secure payment service option for various third parties the customer regularly makes purchases from.

As shown in FIG. 1, the customer device 102 includes a display 120, a network interface circuit 122, and an input/output circuit 124. The display 120 is a device used to display information in the form of text, images, video, etc. to the customer. For example, the display 120 is a screen, a touchscreen, or a monitor. In some arrangements, the customer device 102 uses the display to communicate information to the customer (e.g., by displaying the information to the customer on the display 120). In certain arrangements, the customer device 102 additionally uses the display 120 to receive communications from the customer (e.g., through a keyboard provided on a touchscreen of the display 120).

The network interface circuit 122 is programmed to facilitate connection of the customer device 102 to the network 104. As such, using the network interface circuit 122, the customer may communicate with other systems or devices in the environment 100, such as the provider computing system 106 and/or one or more of the third party payment systems 108. Data passing through the network interface circuit 122 may be encrypted such that the network interface circuit 122 is a secure communication module.

The input/output circuit 124 is structured to receive from and provide communication(s) to the customer associated with the customer device 102. In this regard, the input/output circuit 124 is structured to exchange data, communications, instructions, etc. with input/output components of the customer device 102. Accordingly, in various embodiments, the input/output circuit 124 includes an input/output device, such as the display 120 or a keyboard. In other embodiments, the input/output circuit 124 includes communication circuitry for facilitating the exchange of data, values, messages, and the like between an input/output device and the components of the customer device 102. In yet other embodiments, the input/output circuit 124 includes machine-readable media for facilitating the exchange of information between an input/output device and components of the customer device 102. In still other embodiments, the input/output circuit 124 includes any of a combination of hardware components, communication circuitry, and machine-readable media.

As described above, the provider computing system 106 is associated with an accounts provider, such as a financial institution (e.g., a bank, a credit card issuer, etc.), with which the customer holds one or more accounts (e.g., demand deposit accounts, credit card accounts, etc.). As shown in FIG. 1, the provider computing system 106 includes a network interface circuit 130, a payment information storage determination circuit 132, a third party updating circuit 134, a secure payment circuit 136, and a customer accounts database 138. In practice, the provider computing system 106 includes server computer systems, for example, comprising one or more networked computer systems. In some embodiments, the network interface circuit 130, payment information storage determination circuit 132, third party updating circuit 134, secure payment circuit 136, and/or customer accounts database 138 may reside, in part, on different servers in relation to parts of other components or to the whole of a particular component.

The network interface circuit 130 is programmed to facilitate connection of the provider computing system 106 to the network 104. As such, using the network interface circuit 130, the provider computing system 106 is able to communicate with other systems or devices in the environment 100, such as the customer device 102 and the third party payment systems 108. Data passing through the network interface circuit 130 may be encrypted such that the network interface circuit 130 is a secure communication module.

The payment information storage determination circuit 132 is configured to determine which third parties likely have a customer's payment information saved. In some arrangements, the payment information storage determination circuit 132 is configured to make this determination based on payment history data saved in the provider computing system 106 (e.g., in the customer accounts database 138) for each of the accounts the customer holds with the accounts provider associated with the provider computing system 106. In these arrangements, the payment information storage determination circuit 132 is programmed to mine the stored payment history data for a given account and perform analytics on the payment history data to identify third parties that are likely storing the customer's payment information.

For example, in various arrangements, the analytics are directed to first identifying a subset of the payment history data relating to online payments made from the customer's account, as opposed to payments made in brick-and-mortar locations (e.g., by removing data relating to payments requested at point-of-sale devices from the mined payment history data). The analytics are next directed to identifying characteristics of the online payments made from the payment account and determining the third parties likely storing the customer's payment information based on the identified characteristics. As an illustration, determining the third parties likely storing the customer's payment information may include (a) identifying third parties that the customer makes recurring payments to from the account (e.g., based on a determination that payments are always made from the account to the third party on the same day of the month and in the same amount), (b) identifying third parties that the customer frequently makes payments to (e.g., based on a determination that a certain number of payments have been made from the account to the third party within a certain period of time), (c) identifying third parties that the customer has made payments to and that are known to save other customers' payment information, (d) identifying third parties that always save customer payment information (e.g., based on a determination at least one payment has been made from the account to a third party, such as a ridesharing company, that requires payment information to be saved before the customer can use the third party's services), (e) identifying third parties via which the customer has made payments (e.g., based on a determination that a payment method used to make payments from the account is a third party peer-to-peer payment service that stores payment information), and so on from the online payment history data.

Moreover, in certain arrangements, the payment information storage determination circuit 132 performs analytics that also take into consideration various preferences the customer has configured for the account. In one example, the payment information storage determination circuit 132 is programmed to perform analytics that identify a series of recurring payments made from the customer's account to a third party and compare the payments with the customer's bill pay settings. If the third party is an automatic bill payee for the account, the analytics determine that the third party is not likely storing the customer's payment information, as it is unlikely that the customer would set the third party as a bill payee if the third party was storing the customer's payment information.

In other arrangements, the payment information storage determination circuit 132 is configured to determine which third parties are likely storing the customer's payment information for accounts the customer holds with the provider associated with the provider computing system 106 and with other accounts providers. As an example, the customer provides the provider computing system 106 with the customer's login credentials for a website having additional payment history information for the customer, such as credentials for the banking website for another accounts provider with which the customer holds one or more accounts, credentials for a peer-to-peer payment system through which the customer makes payments, and so on. The payment information storage determination circuit 132 is then programmed to use the customer's login credentials to access the website.

The payment information storage determination circuit 132 is further configured to perform screen scraping on the website to gather payment history data for accounts the customer holds with both the accounts provider associated with the provider computing system 106 and other accounts providers. In various arrangements, the payment information storage determination circuit 132 is structured to perform the screen scraping by capturing the website's screen input for displaying payment history data to the customer (e.g., on a browser) and processing the screen input to isolate and extract payment history data from the screen input. However, in other arrangements, the payment information storage determination circuit 132 gathers the payment history data from the website using other data scraping methods, such as through report mining (e.g., by capturing reports including payment history data and processing the reports to extract the payment history data). The payment information storage determination circuit 132 is programmed to subsequently analyze the gathered payment history data similarly to payment history data stored in the provider computing system 106 (e.g., through data mining and analytics as described above) to identify third parties likely storing the customer's payment information.

In another example, the payment information storage determination circuit 132 is programmed to gather payment history information for the customer that is stored at a different accounts provider or other payment service system affiliated with the provider computing system 106 (e.g., a peer-to-peer payment system that is also associated with the provider). The payment information storage determination circuit 132 is then programmed to perform data mining and analytics on the gathered payment history information as described above to determine third parties likely storing the customer's payment information.

The payment information storage determination circuit 132 is also configured to present to the customer a list of the third parties determined to be likely storing the customer's payment information. In various embodiments, the payment information storage determination circuit 132 is programmed to interface with the customer device 102 (e.g., through Application Programming Interfaces ("APIs")) and present the list of third parties via a graphical user interface displayed on the customer device 102 (e.g., on the display 120). In one example, the customer accesses an online customer profile associated with the provider computing system 106 via the customer device 102, and the payment information storage determination circuit 132 is programmed to display the list of third parties on the customer profile. In another example, the customer device 102 is a smartphone running a mobile banking application thereon. The payment information storage determination circuit 132 is programmed to interface with the mobile banking application and display the list of third parties to the customer as one of the graphical user interfaces associated with the mobile banking application.

The third party updating circuit 134 is configured to update the customer's payment information with third parties that have been determined as likely storing the customer's payment information. In some arrangements, the third party updating circuit 134 is configured to automatically update these third parties when the customer's payment information changes. As an example, for a credit card account, the third party updating circuit 134 is configured to automatically update third parties storing the customer's payment information when the customer is reissued a credit card with a new expiration date and CVC, when the customer's credit card is lost or stolen and the accounts provider must issue the customer a new credit card, when the customer changes his or her billing address, and so on. In other arrangements, the third party updating circuit 134 is configured to only update payment information with third parties in response to a request from the customer. For example, in one embodiment, the third party updating circuit 134 is programmed provide a graphical user interface to the customer on the customer device 102 including a button that the customer can press, in response to which the provider computing system 106 will provide the updated payment information to the third party. In some embodiments, in order to update the customer's payment information with the third party, the provider computing system 106 must have a preexisting relationship with the third party such that the provider computing system 106 can transmit the updated payment information to the third party via a secure communication channel.

Furthermore, in certain arrangements, the third party updating circuit 134 is configured to automatically transmit a notification to a third party instructing the third party to delete the stored payment information for the customer in response to a determination by the provider computing system 106 that the third party is likely fraudulent or unsafe. In one example, the provider computing system 106 is configured to use feedback from online communities (e.g., Yelp, Google reviews) to determine that a third party is likely fraudulent. In another example, the provider computing system 106 is configured to use feedback from other customers to determine that a third party is likely fraudulent. Responsive to a determination by the provider computing system 106 that a given third party is likely fraudulent, the third party updating circuit 134 is programmed to notify the third party to delete the customer's payment information and also notify the customer that the third party is likely fraudulent.

The secure payment circuit 136 is configured to provide a secure payment service for customers and third parties. Third parties can enroll in the secure payment service, and the customer can then select for which third parties the customer would like to use the secure payment service option with one or more of the customer's payment accounts. The customer then notifies, or the secure payment circuit 136 is programmed to notify, the third party that the secure payment service option has been activated by the customer for the third party. Then, rather than the customer having to provide payment information to a third party in order to make a payment, the third party contacts the provider computing system 106 directly to receive payment information for the customer. In response, the secure payment circuit 136 is programmed to transmit a one-time use token representing the customer's payment account that has been activated for the secure payment service to the third party. The third party and the provider computing system 106 are then able to process the payment from the customer's account using the token. In some arrangements, the secure payment service is only available for reoccurring or subscription payments to third parties. In other arrangements, the secure payment service is available for any type of payment to a third party, including a one-time payment.

Thus, as discussed above, the secure payment circuit 136 is configured to allow third parties to enroll in the secure payment service. For example, the secure payment circuit 136 is configured to set up a secure communication channel with third parties that express a desire to enroll in the secure payment service to the accounts provider associated with the computing system 106. In some arrangements, the secure payment circuit 136 is configured to communicate directly with the third parties enrolled in the secure payment service (e.g., via a direct, secure communication channel between the provider computing system 106 and the third party). In other arrangements, the secure payment circuit 136 is configured to communicate indirectly with the third parties enrolled in the secure payment service, such as via a card network.

Figure 7A:
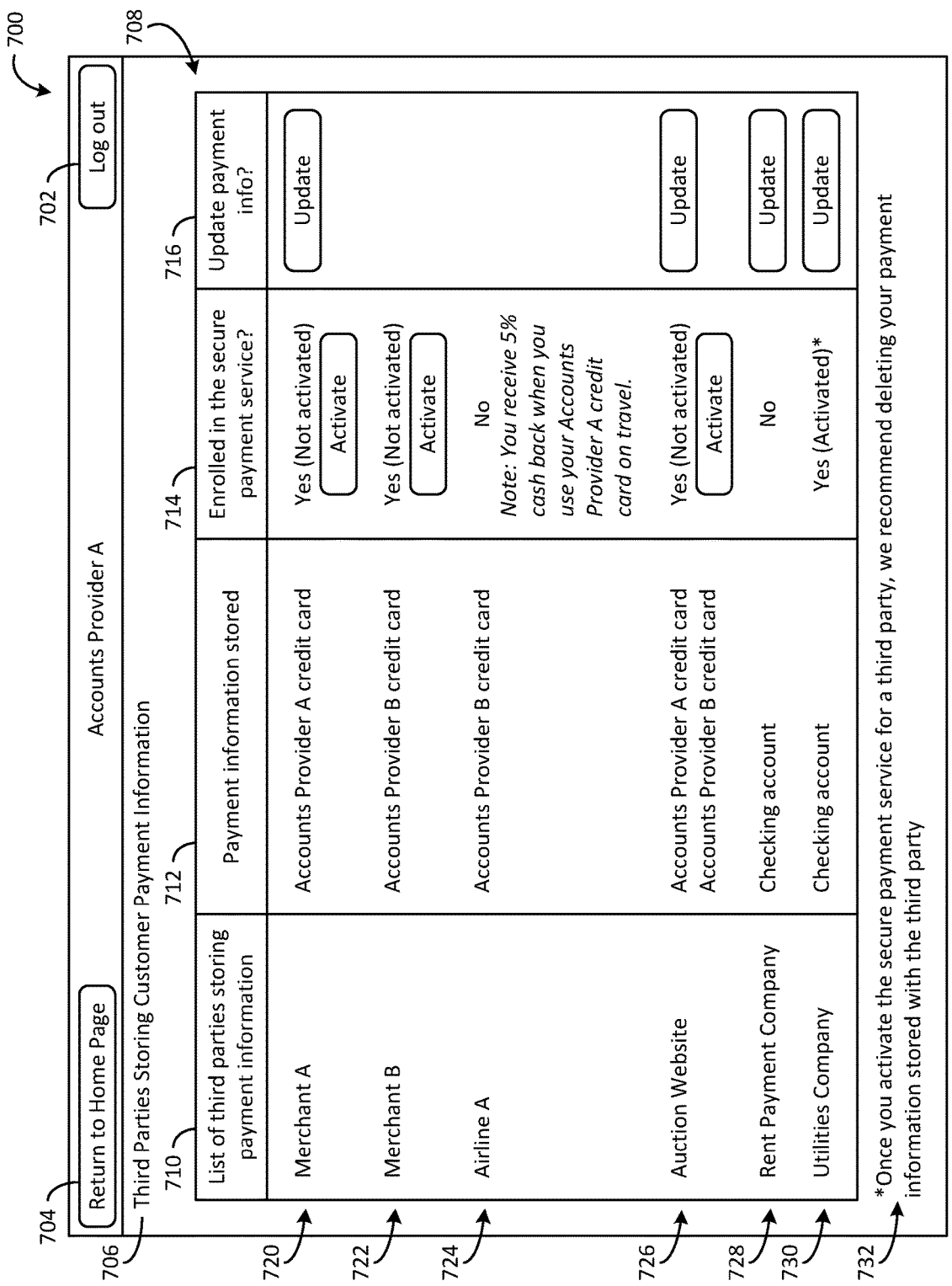
FIGS. 7A and 7B are interfaces shown on a display of a customer device, including graphics displaying payment access management menus according to an example embodiment.
Figure 7B:
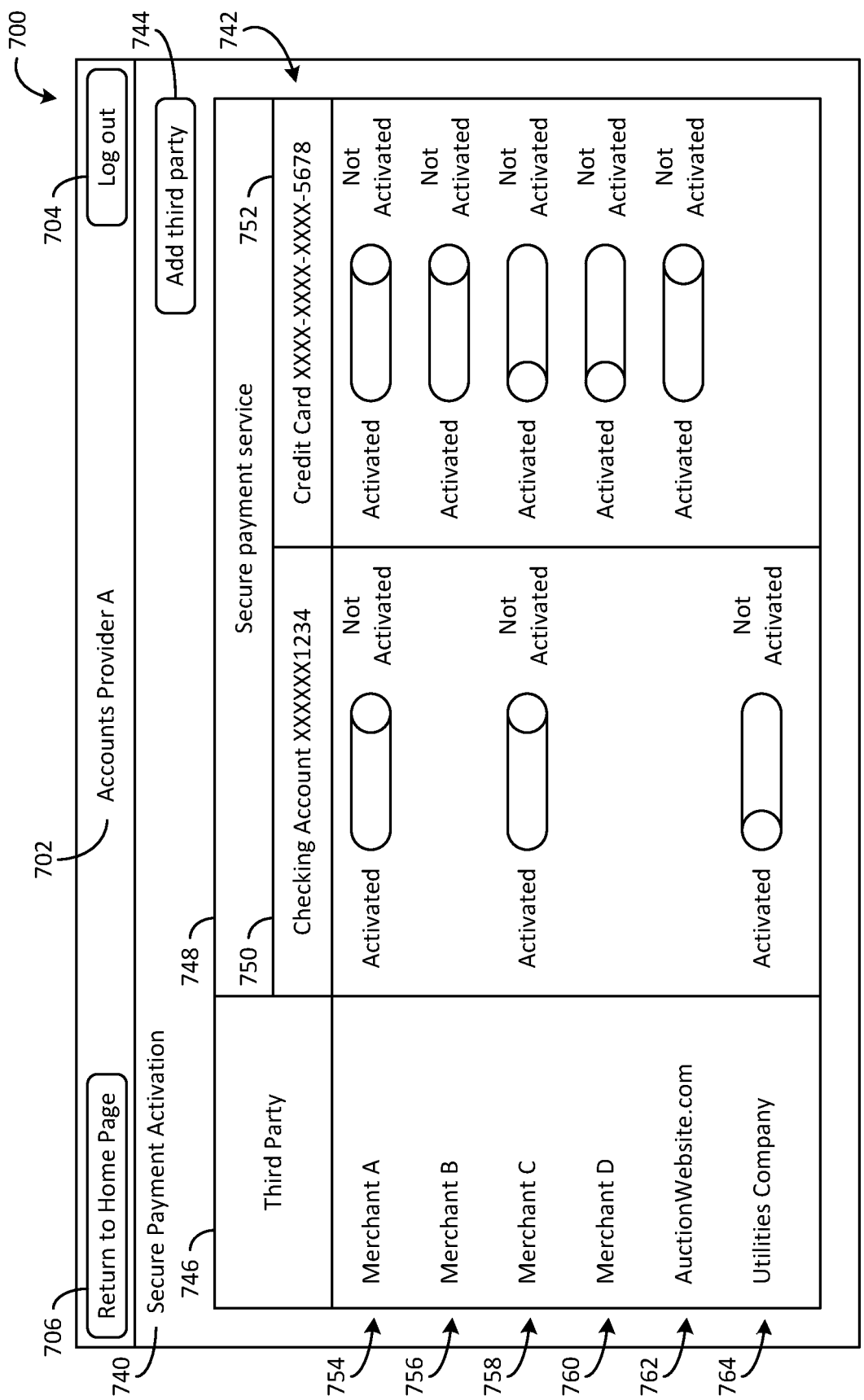

As further discussed above, the secure payment circuit 136 is also configured to allow customers to opt into and out of the secure payment service. In various embodiments, the secure payment circuit 136 is configured to interface with the customer device 102 and provide graphical user interfaces (e.g., via the display 120) enabling the customer to opt into and out of the secure payment service (e.g., as shown in FIG. 7B). In one example, using the customer device 102, the customer logs into a website associated with the provider computing system 106, and the secure payment circuit 136 is configured to provide these graphical user interfaces to the customer via the website. In another example, the customer device 102 runs an application associated with the provider computing system 106 (e.g., a mobile banking application). The secure payment circuit 136 is configured to interface with the customer device 102 (e.g., using APIs) and present these graphical user interfaces to the customer via the customer device 102. In either example, the graphical user interfaces allow the customer to select whether the customer would like to opt into or out of the secure payment service for various third parties, and the secure payment circuit 136 is configured to receive the customer's selections and implement the secure payment service accordingly.

In some embodiments, the customer is presented the option, via the graphical user interfaces, to activate the secure payment service for the enrolled third parties determined to be likely storing the customer's payment information. In other embodiments, additionally or alternatively, the customer is able to generally select enrolled third parties and use the secure payment service with the selected third parties. In one example, the graphical user interfaces include a list of enrolled third parties that the customer can scroll through and select (e.g., by clicking on the names of the enrolled third parties, by checking a box next to the third parties). The secure payment circuit 136 is programmed to then activate the secure payment service for these selected third parties.

Additionally, in some arrangements, after the customer activates the secure payment service for a given third party (e.g., a third party associated with a third party payment system 108), the customer notifies the third party that the customer has activated the secure payment service for the third party. The third party then verifies the activation with the provider computing system 106. Alternatively, in other arrangements, the secure payment circuit 136 is configured to notify the third party that the customer has activated the secure payment service for the third party.

After the secure payment service has been activated between a customer and a third party, when the provider computing system 106 subsequently receives a "secure payment" request initiated by the customer (e.g., via a third party payment system 108) for fulfillment through the secure payment service, the secure payment circuit 136 is configured to identify the customer account from which the payment should be made. In some embodiments, the third party payment system 108 provides identifying information for the customer with the secure payment request, such as an email, a password, a personal identification number ("PIN"), a scan of a driver's license, and so on. The secure payment circuit 136 is programmed to use the identifying information to identify the customer and the customer account from which the payment should be made. In some arrangements, the identifying information corresponds to a specific customer account, and the secure payment circuit 136 is programmed to identify the customer account based just on the received identifying information. In other arrangements, the identifying information corresponds to a customer with multiple accounts at the accounts provider associated with the provider computing system 106 that are activated for the secure payment service with the third party. The secure payment circuit 136 is thus programmed to identify the customer account to be used for the payment based on, for example, preconfigured payment settings entered by the customer or purchase information about the transaction also transmitted by the third party payment system 108 (e.g., based on the transaction being for airline tickets, the customer's travel credit card is selected for the transaction).

Alternatively, in other embodiments, the third party payment system 108 identifies the customer to the provider computing system 106. For example, the third party payment system 108 identifies the customer based on login credentials provided by the customer in making the payment request. The secure payment circuit 136 is programmed to then identify the customer account for the transaction based on the identification of the customer by the third party payment system 108 and, in some arrangements, further based on purchase information also transmitted by the third party payment system 108 with the payment request.

Once the customer account to be used for the payment has been identified, the secure payment circuit 136 is configured to create a one-time use token representing the customer account. For example, the secure payment circuit 136 is programmed to generate a random number and store the random number or alphanumeric string in association with the customer account in a token vault (e.g., in the customer accounts database 138). As another example, the secure payment circuit 136 is programmed to use a cryptographic algorithm to generate a token based on the customer account number (e.g., a hash of the customer's primary account number ("PAN")). The secure payment circuit 136 is programmed to then transmit the one-time use token to the third party payment system 108 (e.g., either directly or via a card network). Subsequently, the secure payment circuit 136 is programmed to decode the token and retrieve the customer account number as part of processing the payment from the customer's account. For example, the secure payment circuit 136 is programmed to use the token vault or decrypt the token hash to identify the customer account number. The secure payment circuit 136 is configured to then authorize the payment for the transaction and charge the customer's account (e.g., remove funds from the account, decrease the amount of credit available from the account). If the third parties later issues the customer a refund for the transaction (e.g., because the customer returned an item purchased from the third party), the secure payment circuit 136 is similarly configured to receive the refund request, identify the token originally used in the transaction, and decode the token to identify the customer account used for the transaction and process the refund.

In some arrangements, the secure payment circuit 136 is configured to only allow the customer to opt into or out of the secure payment service as a whole (e.g., once the customer opts in, the secure payment service is used for all of the customer's transactions with the enrolled third parties listed for the customer). In other arrangements, the secure payment circuit 136 is configured to allow the customer to opt into and out of the secure payment service for specific third parties. For example, the payment information storage determination circuit 132 is configured to provide graphical user interfaces to the customer that list the third parties likely storing the customer's payment information saved and display a toggle switch next to each third party that is enrolled in the secure payment service. Accordingly, the customer can activate or deactivate the secure payment service option for each eligible third party by toggling the switch.

Additionally, in some embodiments, when the customer opts into the secure payment service with a third party, the secure payment circuit 136 is programmed to send a notification to the customer reminding the customer that the customer can delete the customer's payment information stored with the third party. Alternatively, the secure payment circuit 136 is programmed to notify the third party that the third party can delete the customer's saved payment information. As discussed above, the fact that the third party can delete the customer's saved payment information once the third party has enrolled in the secure payment service and the customer has activated the secure payment service for the third party is advantageous to both the customer and the third party. By doing so, the third party's data storage requirements are lessened, and the third party does not run the risk of a data breach occurring where the customer's payment information is leaked. The customer likewise does not have to worry about the security of the customer's payment information stored with the third party or the necessity of updating the customer's saved payment information with the third party in the future. As such, notifying the customer or the third party to delete the customer's saved payment information helps ensure that the customer and the third party take advantage of these benefits of the secure payment service.

Furthermore, in some embodiments, the secure payment circuit 136 is configured to activate or deactivate the secure payment service on the customer's behalf. For example, in one embodiment, if the provider computing system 106 makes a determination that a third party storing the customer's payment information is likely to suffer a data security breach (e.g., because the third party does not use sufficient security protocols to protect customer payment information), the secure payment circuit 136 is configured to automatically activate the secure payment service for the third party. The secure payment circuit 136 is further configured to notify the third party to delete the stored payment information for the customer. In this way, the customer can continue carrying out transactions with the third party without the risk of the customer's payment information being compromised. Alternatively, if the provider computing system 106 makes a determination that a third party the customer has been making automatic, reoccurring payments to using the secure payment service is likely fraudulent (e.g., based on an independent determination by the provider computing system 106 and/or based on online community input that the third party is likely fraudulent), the secure payment circuit 136 is configured to deactivate the secure payment service such that the customer can no longer make automatic payments to the third party. The secure payment circuit 136 is further configured to notify the customer that the third party is likely fraudulent.

The customer accounts database 138 is configured to retrievably store account information for various customers of the accounts provider associated with the provider computing system 106. For example, in various embodiments, the customer accounts database 138 stores payment information for customers, such as account numbers, account types, account balances, transaction histories, and billing or contact addresses. In particular, the customer accounts database 138 is configured to store payment history data for various customers from which lists of third parties likely storing the customers' payment information can be determined. The customer accounts database 138 is also configured to store payment history data for payment accounts held by various customers with other accounts providers that is gathered by the payment information storage determination circuit 132. Additionally, the customer accounts database 138 is configured to store various customer preferences relating to the payment information access management systems and methods described herein. For example, the customer accounts database 138 is configured to store whether and for which third parties a customer has activated the secure payment service. Further, in some arrangements, the customer accounts database 138 includes a token vault, which identifies the account associated with a given one-time use token (e.g., the token vault includes token-to-PAN mapping) generated as part of the secure payment service.

As shown in FIG. 1, the environment 100 also includes a plurality of third party payment systems 108. Each third party payment system 108 is associated with a merchant (e.g., a retailer, a wholesaler, a marketplace operator, a service provider) or another individual or organization with which a customer can enter into transactions. In operation, each third party payment system 108 determines an amount owed by a customer for a transaction and processes a payment from the customer's account for the transaction. In some arrangements, a third party payment system 108 is or includes a device or computing system configured to facilitate a purchase payment, such as a computing system running an online checkout system for the third party, a merchant computing system, and so on. In other arrangements, a third party payment system 108 is or includes a computing system associated with an accounts provider for the third party. For purposes of clarity, FIG. 1 is described with reference to a single third party payment system 108, but it should be understood that multiple third party payment systems 108 may be part of the environment 100.

In various embodiments, each third party payment system 108 includes a network interface circuit 150, a payment processing circuit 152, and a customer payment information database 154. The network interface circuit 150 is programmed to facilitate connection of the third party payment system 108 to the network 104. As such, the third party payment system 108 may communicate with other systems or devices in the environment 100, such as the customer device 102 and/or the provider computing system 106. Data passing through the network interface circuit 150 may be encrypted such that the network interface circuit 150 is a secure communication module.

The payment processing circuit 152 is configured to process payments initiated by customers for transactions. Accordingly, in various arrangements, the payment processing circuit 152 is configured to gather payment information from a customer or use saved payment information for the customer to process a transaction payment. Alternatively, if the third party is enrolled in the secure payment service, the payment processing circuit 152 is configured to transmit a secure payment request to the provider computing system 106 (e.g., via a secure communication channel, via a card network) and receive a one-time use payment token from the provider computing system 106 representing the customer's account number. In some embodiments, the payment processing circuit 152 is programmed to only process a payment for the customer using the secure payment service in response to the customer requesting that the payment be made using the secure payment service (e.g., during an online checkout, by the customer clicking a button indicating that the payment should be made using the secure payment service). Otherwise, the payment processing circuit 152 is programmed to use saved payment information for the customer or request that the customer provide payment information to the third party payment system 108. In other embodiments, when a customer enters into a transaction with the third party, the payment processing circuit 152 is programmed to determine whether the customer or the provider computing system 106 has notified the third party payment system 108 that the customer has activated the secure payment service for the third party (e.g., by checking customer profile data stored in the customer payment information database 154). If the customer has activated the secure payment service for the third party, the payment processing circuit 152 is programmed to then automatically use the secure payment service provided by the provider computing system 106 to process the payment for the customer.

In some arrangements, when using the secure payment service to process a payment, the payment processing circuit 152 is further configured to gather identifying information for the customer such that the customer can be identified to the provider computing system 106 and/or the provider computing system 106 can identify the customer account from which the payment should be made. For example, in various embodiments, the payment processing circuit 152 is programmed to gather a username and password, a PIN, a scan of a driver's license or other form of identification, and so on from the customer. The payment processing circuit 152 is programmed to then transmit the identifying information to the provider computing system 106 (e.g., either directly or via a card network) along with purchase information. In other arrangements, the payment processing circuit 152 is configured to authenticate the customer (e.g., with a username and password combination) and transmit an identification of the customer to the provider computing system 106 along with purchase information.

As discussed above, in response to receiving the request for a payment via the secure payment service, the provider computing system 106 transmits a one-time use token representing the customer's account to be used for the payment, which the payment processing circuit 152 is configured to receive. The payment processing circuit 152 is then configured to use the token to complete the transaction. Additionally, if the customer later requests a refund for the transaction (e.g., the customer returns an item purchased as part of the transaction), the payment processing circuit 152 is, for example, configured to identify the token used in the transaction and transmit the refund request and token to the provider computing system 106, which processes the refund.

Figure 2:
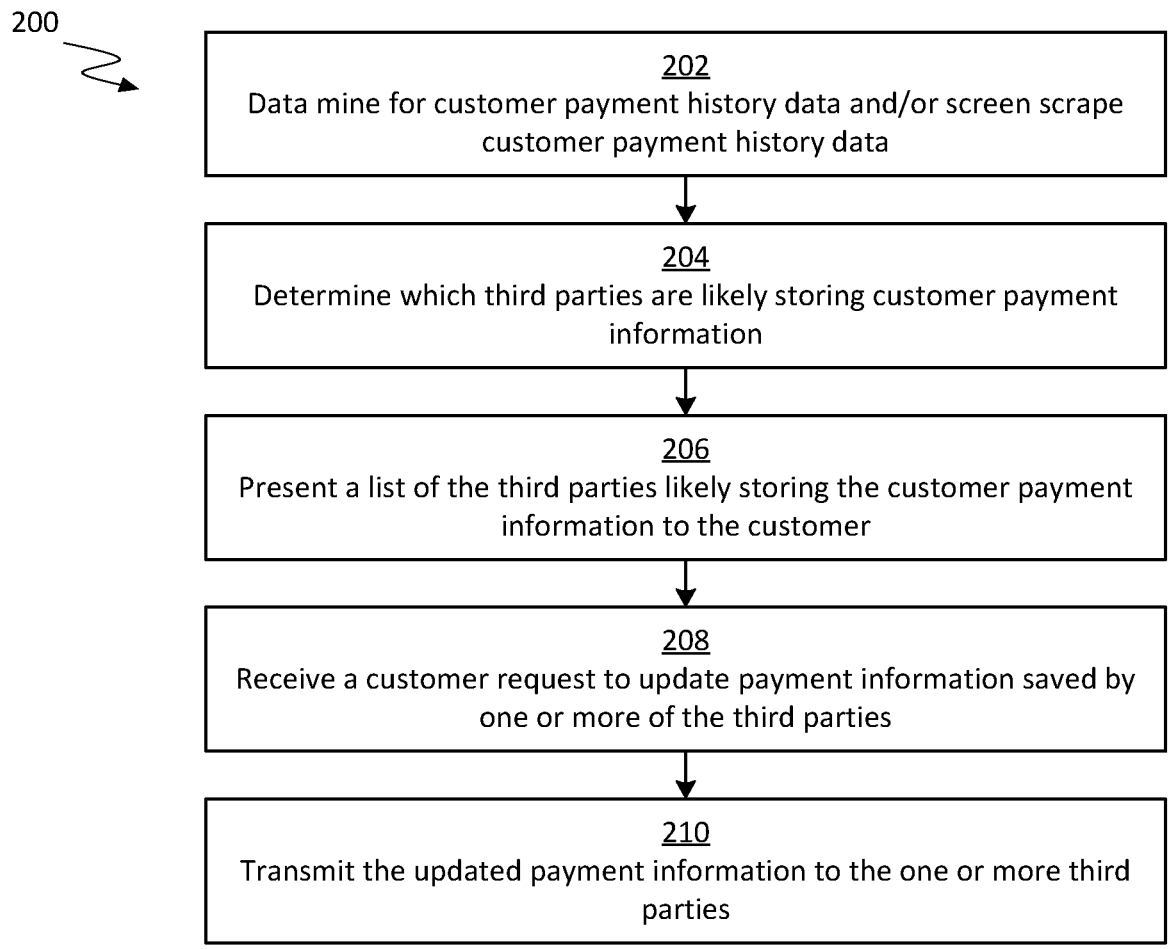
FIG. 2 is a flow diagram of a method of updating payment information with a third party according to an example embodiment.

Referring now to FIG. 2, a flow diagram of a method 200 of updating a customer's payment information with a third party is shown according to an example embodiment. The method 200 is performed by a computing system (e.g., the provider computing system 106). The method 200 begins when the provider computing system 106 data mines for customer payment history data (e.g., from the customer accounts database 138) and/or screen scrapes payment history data (e.g., from a website associated with another accounts provider that the customer holds accounts with) for the customer at 202. Accordingly, in some arrangements, payment history data stored in the customer accounts database 138 is analyzed. In other arrangements, payment history data for payment accounts held by customer with other accounts providers is additionally screen scraped from outside sources (e.g., an online banking website associated with another accounts provider, a peer-to-peer payment system with which the customer has an account, etc.) and analyzed.

A determination of which third parties are likely storing customer payment information is made at 204. For example, data analytics is used on the payment history data to identify a subset of the payment history data directed to online payments. Data analytics is also used to identify characteristics of the online payments (e.g., frequency of payments, timing of payments, amounts of payments, methods of payments, and the identities of third parties to which payments have been made) and, based on the characteristics, third parties likely storing the customer's payment information.

A list of the third parties likely storing the customer's payment information is presented at 206. In various embodiments, graphical user interfaces are displayed on the customer device 102 to present the list of third parties to the customer, as discussed in more detail above and as illustrated in FIG. 7A below.

A customer request to update payment information saved by one or more of the third parties is received at 208. Subsequently, the updated payment information is transmitted to the one or more third parties at 210. In various embodiments, a graphical user interface is presented to the customer whereby the customer can make selections to update payment information with third parties determined to be likely storing the customer's payment information. In some arrangements, the customer can select the third parties to which the updated payment information should be provided. In other arrangements, the customer can select that all third parties likely storing the customer's payment information should be provided the updated payment information. In still other arrangements, the customer can provide a preference to the provider computing system 106 that some or all of the third parties likely storing the customer's payment information should be provided with updated payment information whenever the customer's payment information changes. As such, the third parties are automatically provided with updated payment information whenever payment information changes occur (e.g., the customer's billing address changes, the customer is issued a new credit card). Alternatively, some or all of the third parties likely storing the customer's payment information are provided with updated payment information for the customer even without a selection from the customer.

Figure 3A:
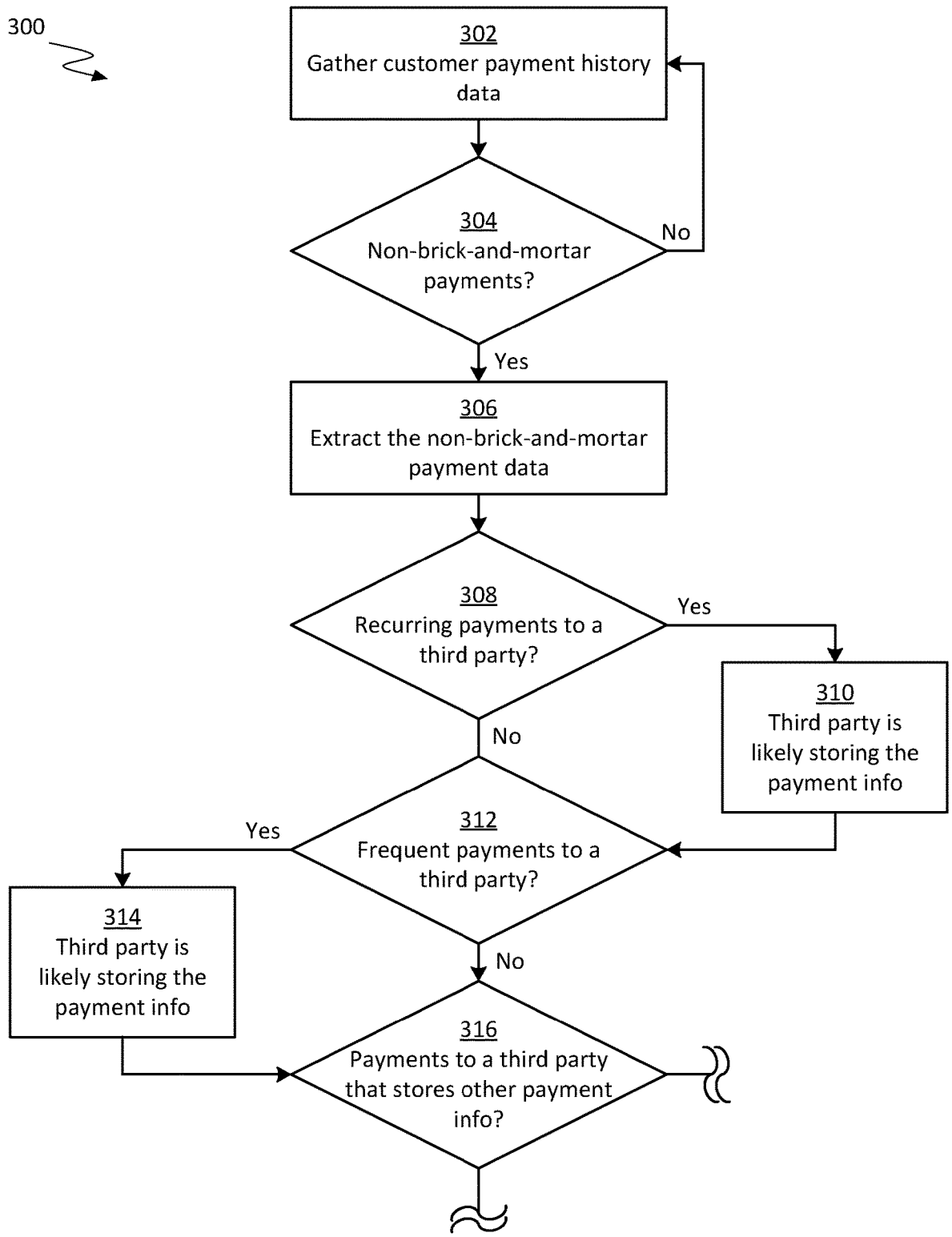

Referring now to FIGS. 3A and 3B, a flow diagram of a method 300 of determining, and presenting to a customer, third parties that are likely storing the customer's payment information is shown according to an example embodiment. The method 300 is performed by a computing system (e.g., the provider computing system 106). In various arrangements, the provider computing system 106 performs method 300 as part of steps 202, 204, and 206 of method 200 described above with reference to FIG. 2. As such, first, customer payment history data for a payment account held by the customer is gathered at 302. For example, stored payment history data for the customer is mined or payment history data is screen scraped and extracted from a web site.

Subsequently, analytics are performed on the payment history data to identify third parties likely storing the customer's payment information. To begin with, whether non-brick-and-mortar payments are included in the payment history data is determined at 304. In certain arrangements, metadata for the payments included in the payment history data is examined to determine if online payments have been made to third parties. For example, an online payment is identified when the metadata indicates that the payment is an online payment, that the payment was made using a payment service (e.g. PayPal®, Venmo®, etc.), that the payment was made to a third party that can only be paid online, etc. If only brick-and-mortar payments are identified, payment history data is again gathered at 302. If instead non-brick-and-mortar payments are identified, the subset of non-brick-and-mortar payments is extracted from the payment history data at 306.

Once the subset of non-brick-and-mortar payments is extracted, various characteristics of the non-brick-and-mortar payments made from the payment account are identified and used to determine third parties likely storing the customer's payment information. Examples of the characteristics are presented in method 300. To begin with, whether recurring online payments have been made from the account to a third party is determined at 308. Recurring payments may be defined, for example, as payments made on the same day of the month in the same amount for a certain number of months or payments made on the same day of the week in the same amount for a certain number of weeks. If a third party is identified as a recipient of recurring payments, the third party is determined to be likely storing the customer's payment information at 310.

After identifying third parties likely storing the customer's payment information at 310, or identifying that recurring payments have not been made to any third party, whether frequent payments have been made from the account to a third party is determined at 312. As an example, frequent payments may be defined as a certain number of payments being made within a certain time period to the third party (e.g., five payments made in a month). As another example, frequent payments may be defined based on the customer's history of using the payment account (e.g., a certain percentage of the customer's payments from the account have been made to the third party). If a third party is identified as a recipient of frequent payments, the third party is determined to be likely storing the customer's payment information at 314.

After identifying third parties likely storing the customer's payment information at 314, or identifying that frequent payments have not been made to any third party, whether payments have been made to a third party that is known to store other customers' payment information is determined at 316. For example, a database may store a list of third parties determined to be likely storing a certain number of other customers' information. The subset of customer payment history data is thus compared to the list to identify the third parties common to the list and the data. If a third party known to store other customers' payment information is identified as a recipient of payments from the account, the third party is determined to be likely storing the customer's payment information at 318. In some arrangements, the third party is only determined to be likely storing the customer's payment information if a certain number of payments are made to the third party. In other arrangements, the third party is determined to be likely storing the customer's payment information based at least partially on how often the third party is known to store payment information (e.g., if only a few payments have been made from the account to a third party that is highly likely to store payment information, the third party is still determined to be likely storing the customer's payment information).

After identifying third parties likely storing the customer's payment information, or identifying that no payments or that fewer than a certain threshold of payment have been made to third parties known to store other customers' payment information, whether payments have been made to a third party known to always store payment information is determined at 320. As an example, a list is maintained of third parties that require storing payment information for a customer before the customer can use a service provided by the third party (e.g., a ride sharing service). The subset of payment history data is then compared to the list to identify the third parties common to the list and the data. If a third party known to always store payment information is identified, the third party is determined to be likely storing the customer's payment information at 322.

After identifying third parties likely storing the customer's payment information, or identifying that no payments have been made to third parties known to always store payment information, whether payments have been made via third party payment services is determined at 324. For example, whether the customer has made a payment from the account through a peer-to-peer payment system (e.g., PayPal®, Venmo®, etc.) is identified. If a third party payment system is identified in the payment history data, the third party is determined to be likely storing the customer's payment information at 326.

After identifying third parties likely storing the customer's payment information, or identifying that no payments have been made via third party payment systems, a list of the third parties (if any) identified at 310, 314, 318, 322, and 326 is compiled at 328 (e.g., the identities of third parties likely storing the customer's information are stored in the customer accounts database 138 in connection with the customer). A determination of whether a request for the list has been received from the customer is made at 330. If a request has been received, then the list of the third parties likely storing the customer's payment information is presented to the customer at 332. Subsequently, the method 300 is then repeated such that additional payment history data is gathered and analyzed as described herein. The method 300 is likewise repeated if a request for the list of third parties likely storing the customer's payment information has not been received.

It should be understood, however, that method 300 is an example method. In other embodiments, different analyses may be applied to the payment history data to identify third parties likely storing the customer's payment information. Moreover, in certain embodiments, at least some of the analyses discussed with reference to method 300 may be combined. For example, in another embodiment, the method 300 of determining third parties likely storing the customer's payment information includes a step of determining whether frequent payments have been made to a third party known to store other customers' payment information.

Figure 4:
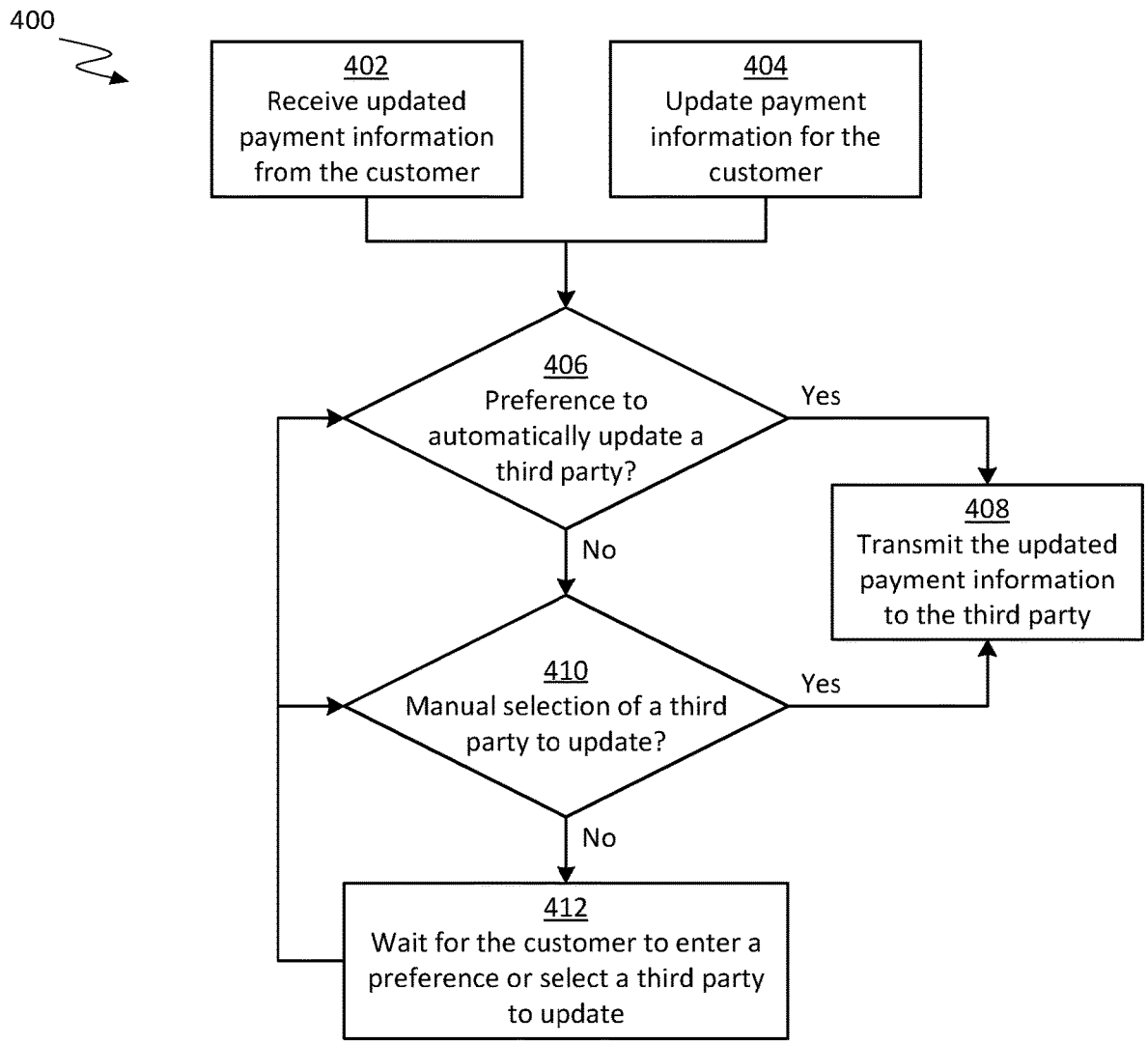
FIG. 4 is a flow diagram of a method of updating payment information with a third party according to an example embodiment.

Referring now to FIG. 4, a flow diagram of a method 400 of updating payment information for a payment account held by the customer with a third party is shown according to an example embodiment. The method 400 is also performed by a computing system (e.g., the provider computing system 106). In various arrangements, the provider computing system 106 performs method 400 as part of steps 208 and 210 of method 200 described above with reference to FIG. 2. The method 400 begins when updated payment information is received from the customer at 402 (e.g., the customer updates the customer's billing address). Alternatively, the method 400 begins when payment information is updated for the customer at 404 (e.g., the customer loses a payment card associated with the payment account, such as a credit card, and must be issued a new payment card with a new account number).

In response to the updated payment information, a determination is made as to whether there is a stored preference, from the customer, for automatically updating the customer's payment information saved by a third party at 406. In one example, the customer uses a graphical user interface to indicate whether the customer would like certain third parties or all third parties with saved payment information for the customer to be automatically updated when the customer's payment information is modified, and the customer's preference is accordingly stored. Thus, at 406, the customer's stored preference is retrieved.

If the customer has indicated a preference to automatically update a third party, the updated payment information is transmitted to the third party at 408. If the customer has not indicated a preference to a third party (e.g., because there is no stored preference for the customer, because the customer has indicated a preference to update other third parties but not the given third party, etc.), whether the customer has manually selected that the third party be provided the updated payment information is determined at 410. As an example, the customer uses a graphical user interface to indicate that the customer would like a given third party to receive updated payment information (e.g., as shown in FIG. 7A). If the customer has made a manual selection of the third party, the updated payment information is transmitted to the third party at 408. If the customer has not made a manual selection of the third party, no action is taken until the customer enters a preference to automatically update the third party or manually selects that the third party should be updated at 412.

Figure 5:
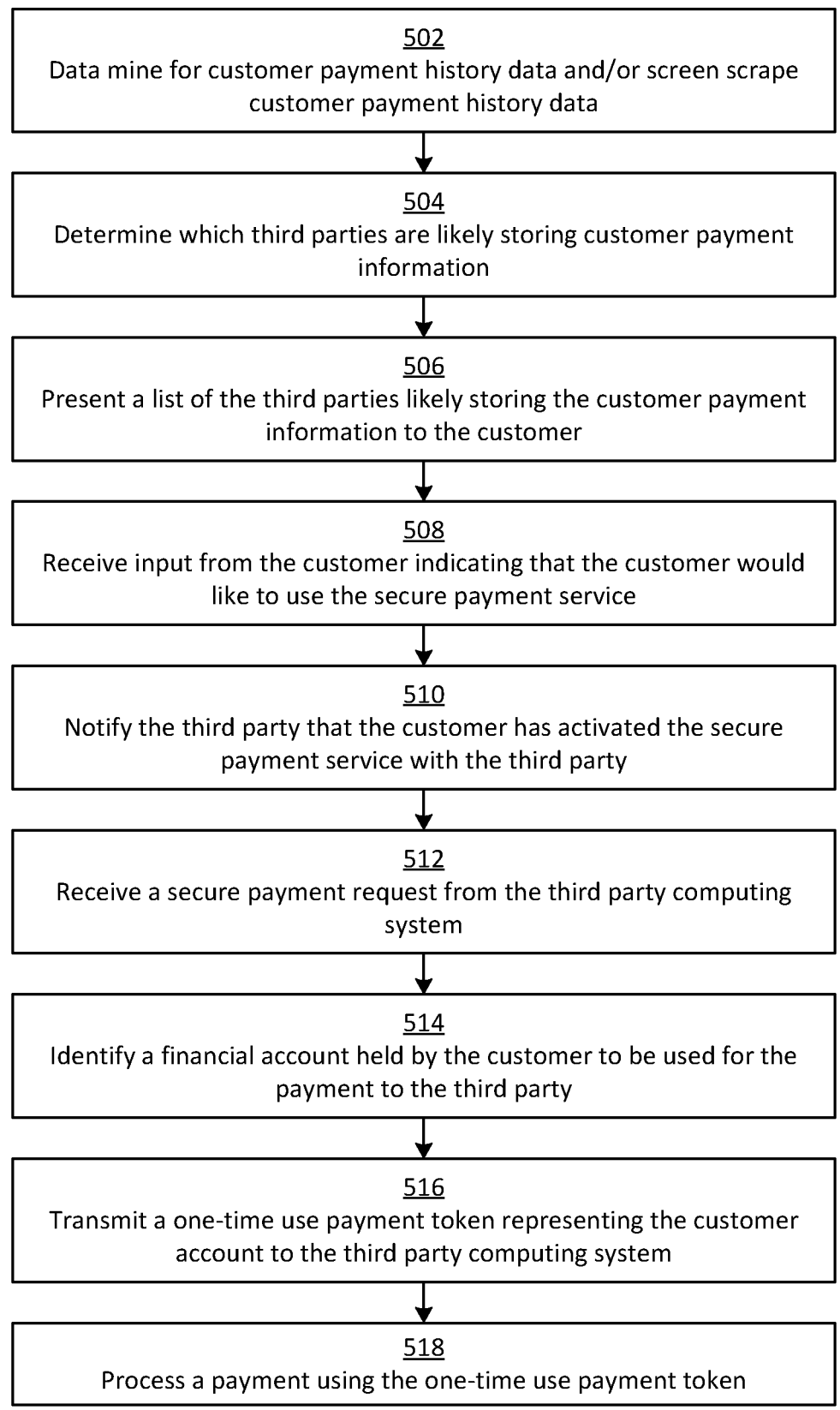
FIG. 5 is a flow diagram of a method of configuring and processing a payment with a secure payment service according to an example embodiment.

Referring now to FIG. 5, a flow diagram of a method 500 of configuring and processing a payment with a secure payment service is shown according to an example embodiment. The method 500 is also performed by a computing system (e.g., the provider computing system 106). The method 500 begins when the provider computing system 106 mines for customer payment history data and/or screen scrapes customer payment history data at 502. Subsequently, a determination of which third parties are likely storing customer payment information is made at 504, and a list of the third parties likely storing the customer's payment information is presented at 506. In various embodiments, steps 502, 504, and 506 are performed similarly to steps 202, 204, and 206 of method 200, as discussed above with respect to FIG. 2. Additionally, in certain arrangements, steps 502, 504, and 506 are performed according to method 300 described above with reference to FIGS. 3A and 3B.

Input from the customer indicating that the customer would like to use the provider's secure payment service is received at 508. In various embodiments, graphical user interfaces are presented to the customer whereby the customer can activate the secure payment service for various third parties. In some embodiments, the customer can use the graphical user interfaces to select which third parties the secure payment service should be used with for one or more of the customer's accounts. In some arrangements, the customer can select third parties determined to be likely storing the customer's payment information. Moreover, in other arrangements, the customer can select third parties not determined to be likely storing the customer's payment information (e.g., by accessing a list of the third parties enrolled in the secure payment service, by searching for third parties enrolled in the secure payment service in a search box). Alternatively, in other embodiments, the customer can select that the secure payment service be used with all third parties likely storing the customer's payment information, with all third parties the customer makes reoccurring payments to, and so on.

The third party is notified that the customer has activated the secure payment service with the third party at 510. Accordingly, the third party payment system 108 is able to store this customer preference (e.g., in the customer payment information database 154) such that, when the customer requests a payment in the future, the third party payment system 108 contacts the provider computing system 106 for a one-time use token. Alternatively, in other embodiments, the third party is not directly notified of the customer's activation of the secure payment service for the third party. Rather, when the customer enters into a transaction with the third party, the customer informs the third party that the customer would like to carry out the transaction using the provider's secure payment service.

A secure payment request is received from the third party payment system 108 at 512. In some embodiments, the provider computing system 106 receives the secure payment request via a secure communication channel between the provider computing system 106 and the third party payment system 108. In other embodiments, the provider computing system 106 communicates with the third party payment system 108 via an intermediary (e.g., a card network).

A payment account or other account held by the customer to be used for the payment to the third party is then identified at 514. In some arrangements, identifying information for the customer is transmitted with the secure payment request. The customer, and thus the customer's account to be used for the transaction, is identified based on the transmitted identifying information. Alternatively, in other embodiments, the customer is authenticated by the third party payment system 108, which identifies the customer to the provider computing system 106. The customer account to be used for the transaction payment is thus based on the identification of the customer by the third party payment system 108. Further, in certain embodiments, if the customer has more than one payment account associated with the provider, once the customer is identified the customer account to be used for the transaction payment is selected based on preconfigured payment settings, purchase information for the transaction transmitted with the secure payment request (e.g., the amount of the transaction, what is being purchased in the transaction), and so on.

A one-time use token representing the customer account is transmitted to the third party payment system 108 at 516. In various embodiments, the token is generated by assigning a random number to the customer account, by outputting a cryptographic hash based on the customer account number, and so on, as discussed above.

Finally, a payment is processed using the one-time use payment token at 518. For example, the provider computing system 106 receives the payment token from the third party payment system 108, either directly or via a card network. The token is then decoded (e.g., by looking up the associated customer account using the token vault, by decrypting the token), and, assuming that the customer account has sufficient available funds or credit, a payment to the third party is authorized from the customer account.

Figure 6A:
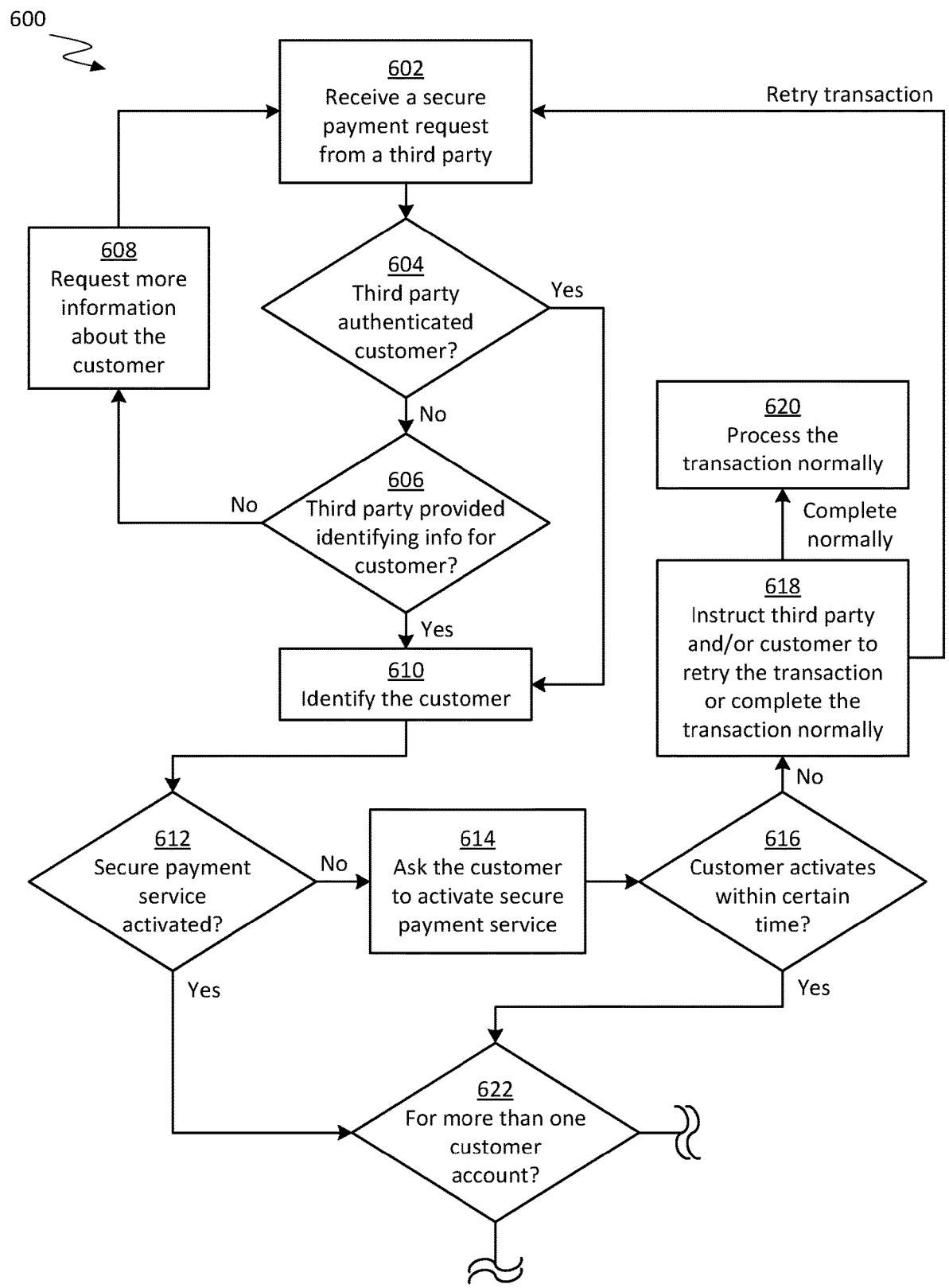
FIGS. 6A and 6B are a flow diagram of a method of making a payment using a secure payment service according to an example embodiment.
Figure 6B:
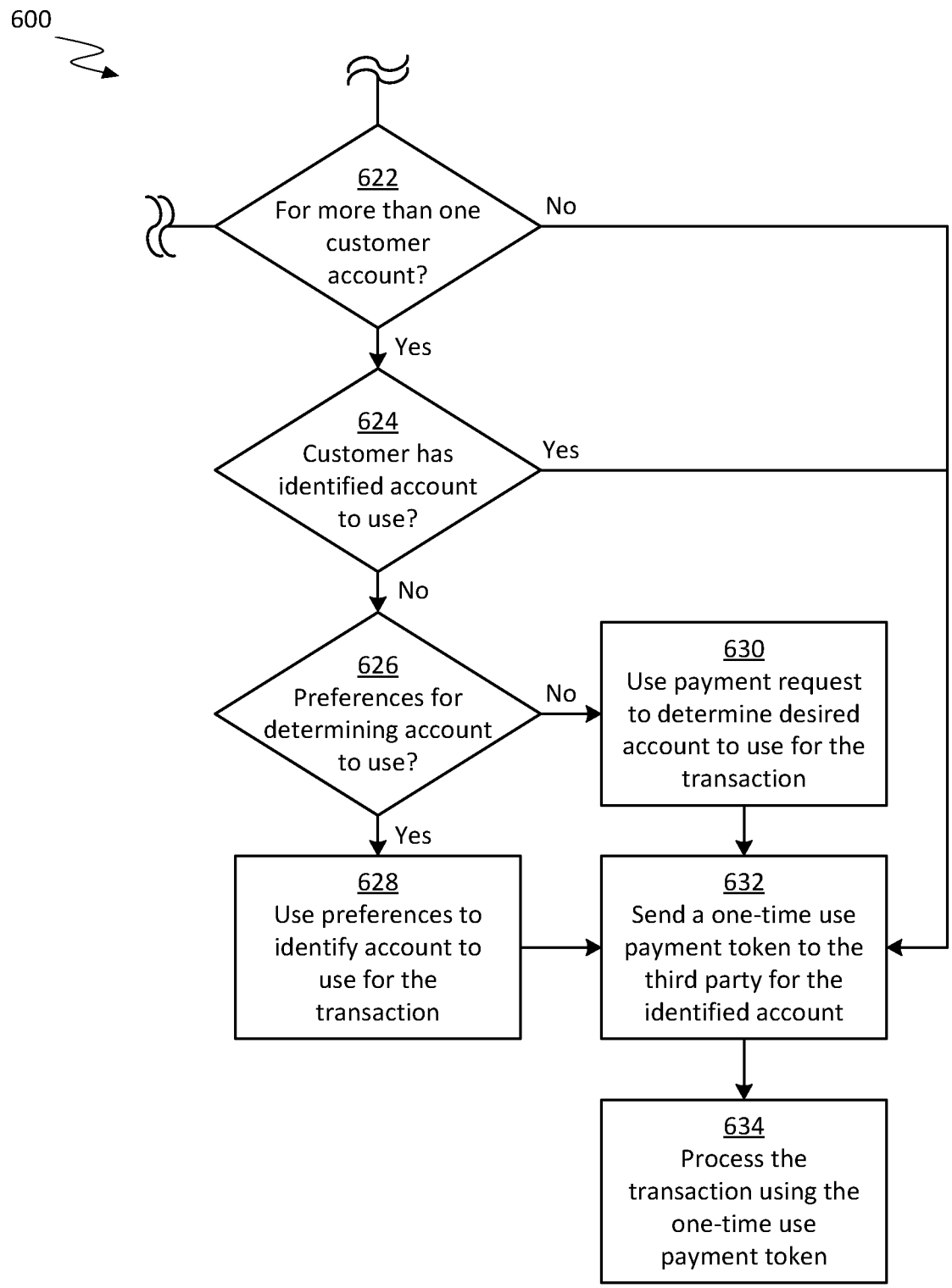

Referring now to FIGS. 6A and 6B, a flow diagram of a method 600 of making a payment using a secure payment service (e.g., offered by the provider computing system 106) is shown according to an example embodiment. The method 600 is further performed by a computing system (e.g., the provider computing system 106). In various arrangements, the provider computing system 106 performs method 600 as part of steps 512, 514, 516, and 518 of method 500 described above with reference to FIG. 5. The method 600 begins when a payment request to be made via the secure payment service is received from a third party at 602. The payment request may include, for example, information describing the transaction (e.g., the transaction amount, the transaction location, etc.), describing the customer, and so on.

In response to receiving the payment request, whether the third party has authenticated the customer is determined at 604. In one example, the third party authenticates the customer based on login credentials provided by the customer in making the request. The third party then includes the identification of the customer and an indication that the customer has been authenticated in the payment request. If the third party has authenticated the customer, the customer is identified based on the authentication at 610. However, if the third party has not authenticated the customer, whether the third party has provided identifying information for the customer is determined at 606. As an example, the third party requests from the customer and includes in the payment request biographical or other personal information about the customer such as an email, a password, a PIN, a scan of a driver's license or other identification card, an identification number, and so. If identifying information is included in the payment request, the customer is identified at 610. In some arrangements, the customer is also authenticated at 610. In some examples, a two-factor authentication process is carried out (e.g., the provider computing system 106 sends a text to the customer's phone, and the provider computing system 106 only proceeds with method 600 if the customer responds to the text within a certain amount of time). If identifying information is not included in the payment request, more information about the customer is requested from the third party at 608.

Once the customer is identified, a determination of whether the customer has activated the secure payment service for the third party is made at 612. If the customer has not activated the secure payment service, the customer is asked to activate the secure payment service for the third party at 614. For example, the customer is sent a notification, such as an email or a text message, with a link to a web site whereby the customer can activate the secure payment service for the third party (e.g., as shown in FIG. 7B).

Subsequently, a determination is made as to whether the customer activates the secure payment service for the third party within a certain amount of time from the transaction request at 616. If the customer does not activate the secure payment service for the third party within a certain amount of time, the third party and/or the customer are instructed to retry the transaction when the customer has activated the secure payment service or to complete the transaction normally at 618 (e.g., with the customer entering credit card information into an online checkout system for the third party or with the third party using stored payment information for the customer to complete the transaction). If the customer later activates the secure payment service for the third party and the transaction is reattempted, the method 600 is restarted at 602. Alternatively, if the customer and/or the third party elect to complete the transaction normally, the transaction is processed normally at 620 (e.g., by receiving payment card information via an acquirer and a card network, authorizing the transaction, and transferring funds to the acquirer).

If the customer has already activated the secure payment service for the third party, or if the customer activates the secure payment service within a certain amount of time, a determination as to whether the customer has activated the secure payment service for the third party for more than one payment account held by the customer is made at 622. If the secure payment service has been activated for only one account, a one-time use payment token is transmitted to the third party (e.g., via a secure communication channel) for the activated account at 632.

If instead the secure payment service has been activated for more than one account, a determination is made at 624 as to whether the customer has identified the account to use for the transaction (e.g., whether the customer identified the account to use when initiating the transaction with the third party, and the third party transmitted the account identification in the payment request). If the customer has identified the account to use, a one-time use payment token representing the identified account is transmitted to the third party at 632. Otherwise, a determination as to whether stored preferences exist for determining which payment account to use for the transaction at 626. If there are stored preferences for the customer, the preferences are used to identify the account to use for the transaction at 628. For example, if the customer has provided preferences regarding the account that should be used for certain transaction amounts, certain transaction types, certain transaction locations, and so on, the preferences are compared to information about the requested transaction transmitted with the payment request. A determination is then made as to which payment account to use for the transaction based on the results of the comparison (e.g., the payment account with the most matches to the preferences is used for the transaction). As another example, if the customer has indicated that a certain payment account is the default account except for certain transaction types, the payment account is then used for the transaction unless the payment request indicates that it is one of the certain transaction types.

On the other hand, if the customer has not provided preferences for determining which payment account to use (or if, in certain arrangements, the preferences are inadequate for determining which payment account to use), the payment request is used to determine which payment account to use for the transaction at 630. As an illustration, in one example, the customer activates the secure payment service for the third party for a debit account and a credit account the customer holds with an accounts provider. The credit account is then used for the transaction unless the transaction amount indicated in the payment request is greater than the credit remaining for the customer's credit card account. In that case, the customer's debit account is instead used for the transaction.

Once the account to use for the transaction is identified based on the customer's preferences or determined using the payment request, a one-time use token representing the identified account is transmitted to the third party at 632.

After the third party receives the one-time use token, the transaction is processed using the one-time use token at 634.

Referring now to FIGS. 7A and 7B, an interface 700 shown on the display 120 of the customer device 102, including graphics displaying payment access management menus, is illustrated according to an example embodiment. As shown, the interface 700 is provided by Accounts Provider A (e.g., the accounts provider associated with the provider computing system 106) with which the customer holds one or more payment accounts. In the example of FIGS. 7A and 7B, the customer has logged into a profile for the customer associated with the Accounts Provider A (e.g., a website or mobile banking application associated with Accounts Provider A), as shown by a button 702 indicating that the customer can "log out" of the profile. Additionally, the customer has navigated to the pages shown in FIGS. 7A and 7B from a "home page," as indicated by a button 704 that allows the customer to return to the home page. However, it should be understood that, in other embodiments, the customer does not view the payment access management menus shown in FIGS. 7A and 7B by logging into a computing system associated with Accounts Provider A via the customer device 102. For example, the customer instead views the payment access management menus via a computing system situated at a local branch of Accounts Provider A.

In FIG. 7A, the interface 700 displays a page 706 showing which third parties the provider computing system 106 has determined are likely storing the customer's payment information. The third party storage page 706 includes a table 708 listing the third parties, as well as providing various actions that the customer can take with respect to the third parties storing the customer's payment information. As shown, the table 708 includes a column 710 providing a list of the third parties determined to be likely storing the customer's payment information and a column 712 showing which of the customer's payment information is stored with each third party. The table 708 also includes a column 714 showing whether each third party is enrolled in the secure payment service offered by the provider computing system 106 and whether the customer has activated the secure payment service for each enrolled third party. The table 708 further includes a column 716 providing the customer with the option to update the customer's payment information with each eligible third party.

In the example of FIG. 7A, the table 708 includes six third parties that the provider computing system 106 has determined are likely storing the customer's payment information: "Merchant A," "Merchant B," "Airline A," "Auction Website," "Rent Payment Company," and "Utilities Company." As shown in row 720, the provider computing system 106 has determined (e.g., by searching the customer's payment history data stored in the customer accounts database 138) that Merchant A is storing the payment information for a credit card that the customer holds with Accounts Provider A. Additionally, row 720 shows the customer that Merchant A is enrolled in the secure payment service but that the customer has not activated the secure payment service for Merchant A. Row 720 also provides a button in column 714 that the customer can press to activate the secure payment service for Merchant A (e.g., pressing the button in row 720, column 714 will direct the customer to the page 740 shown in FIG. 7B) and a button in column 716 that the customer can press to update the customer's payment information (e.g., the customer's Accounts Provider A credit card and billing information) with Merchant A.

As shown in row 722, the provider computing system 106 has determined (e.g., via screen scraping) that Merchant B is storing the payment information for a credit card that the customer holds with a second accounts provider termed "Accounts Provider B" (e.g., an accounts provider not affiliated with the provider computing system 106). Row 722 also shows the customer that Merchant B is enrolled in the secure payment service but that the customer has not activated the secure payment service for Merchant B and provides a button in column 714 that the customer can press to activate the secure payment service for Merchant B. Similarly, the provider computing system 106 has determined (e.g., via screen scraping) that Airline A is storing the payment information for the customer's Accounts Provider B credit card, as shown in row 724. However, as illustrated in column 714, Airline A is not enrolled in the secure payment service, so the customer is not provided with a button that the customer can press to activate the secure payment service for Airline A. Instead, row 724 shows the customer a message informing the customer that the customer receives 5% cash back when the customer uses the Accounts Provider A credit card on travel. Additionally, in both row 722 and row 724, and unlike with row 720, the customer is not provided a button in column 716 whereby the customer can update the customer's payment information with Merchant B, as the payment information stored with Merchant B and Airline A is not related to Accounts Provider A.

As illustrated in row 726, the provider computing system 106 has also determined (e.g., both via searching the customer's payment history data stored in the customer accounts database 138 and via screen scraping) that the Auction Website is storing the payment information for the customer's Accounts Provider A credit card and Accounts Provider B credit card. Additionally, because the Auction Website is enrolled in the secure payment service, the customer is provided with a button in column 714 whereby the customer can activate the secure payment service for future transactions with the Auction Website. Further, the customer is provided with a button in column 716 that the customer can press to update the customer's Accounts Provider A credit card payment information with the Auction Website.

As shown in rows 728 and 730, the provider computing system 106 has further determined that the Rent Payment Company and the Utilities Company are storing payment information relating to the customer's checking account. While the Rent Payment Company is not enrolled in the secure payment service, the Utilities Company is enrolled in the service, and as shown in column 714, the customer has activated the secure payment service for the Utilities Company. Additionally, for the Utilities Company, the column 714 includes an asterisk that points to a message 732 at the bottom of the third party storage page 706, which indicates to the customer that once the customer has activated the secure payment service for a third party, Accounts Provider A recommends that the customer delete the customer's payment information stored with the third party (e.g., because the secure payment service obviates the need for the third party to store the customer's payment information, which reduces security risks connected with a data breach with the third party). For both rows 728 and 730, the table 708 also includes a button in column 716 that the customer can press to update the customer's payment information (e.g., payment information relating to the customer's checking account with Accounts Provider A) with the Rent Payment Company and the Utilities Company, respectively.

Referring now to FIG. 7B, the interface 700 displays a page 740 that allows the customer to activate and deactivate the secure payment service provided by the provider computing system 106 for each of the enrolled merchants shown on the secure payment activation page 740. For example, in various arrangements, the customer can navigate to the secure payment activation page 740 from the "home page" or by pressing one of the "Activate" buttons shown on the third party storage page 706 of FIG. 7A. Similar to the third party storage page 706, the secure payment activation page 740 includes a table 742 listing various third parties with which the customer can use the secure payment service. In some embodiments, the table 742 lists third parties that the provider computing system 106 has determined are likely storing, or at one time likely stored, the customer's payment information. In other embodiments, additionally or alternatively, the customer can add separate third parties to the table 742 and use the secure payment service with the added third parties. For example, in FIG. 7B, the customer can press a button 744 whereby the customer can add an additional third party to the table 742 (e.g., by pressing the button 744, the customer is redirected to a separate page listing various third parties enrolled in the secure payment service, and the customer can select one or more third parties to add to the table 742).

The table 742 includes a column 746 providing a list of the enrolled third parties for the customer (e.g., included in the list of third parties likely storing the customer's payment information in table 708 and/or added by the customer using the "Add third party" button 744). The table 742 also includes a column 748 providing buttons that the customer can toggle to activate/deactivate the secure payment service for each of the customer's payment accounts. Accordingly, the column 748 includes two sub-columns: a sub-column 750 for activating/deactivating the secure payment service for the customer's checking account (i.e., "Checking Account XXXXXX1234") and a sub-column 752 for activating/deactivating the secure payment service for the customer's Accounts Provider A credit card (i.e., "Credit Card XXXX-XXXX-XXXX-5678").

In the example of FIG. 7B, and as shown in column 746, the table 742 includes six third parties for which the customer can activate/deactivate the secure payment service: "Merchant A," "Merchant B," "Merchant C," "Merchant D," "Auction Website," and "Utilities Company." As discussed further below, some but not all of the enrolled third parties are also included in the table 708 of FIG. 7A. Accordingly, in some arrangements, at least some of the enrolled third parties that are included in table 742 of the secure payment activation page 740 but not included in table 708 of the third party storage page 706 are enrolled third parties that the customer added using the "Add a third party" button 744. Further, in some arrangements, at least some of the enrolled third parties that are included in table 742 of the secure payment activation page 740 but not included in table 708 of the third party storage page 706 are third parties that the provider computing system 106 initially determined were storing the customer's payment information. However, the customer later activated the secure payment system for these enrolled third parties and subsequently deleted the customer's payment information that was stored with these third parties.

Moreover, as shown in FIG. 7B, the customer cannot use the secure payment service for all enrolled third parties for all of the customer's accounts. For example, in various arrangements, when the third party enrolls in the secure payment service with Accounts Provider A, the third party designates which types of payments the third party will accept through the secure payment service (e.g., only credit cards, only debit cards, only e-checks). As such, the customer can only activate/deactivate the secure payment service for the payment types designated by the enrolled third parties.

More specifically, as illustrated in FIG. 7B, row 754 shows that the customer can activate the secure payment service for Merchant A with either the customer's checking account or Accounts Provider A credit card but that the secure payment service for Merchant A is not activated for either account. For example, in some arrangements, the secure payment service is not activated for Merchant A because, although Merchant A was added to table 742, the customer never activated the secure payment service for Merchant A (e.g., by not toggling either button shown in row 754 from "Not Activated" to "Activated"). In other arrangements, the secure payment service is not activated for Merchant A because the customer actively deactivated the secure payment service for both accounts (e.g., by toggling the buttons shown in row 754 from "Activated" to "Not Activated"). Similarly, row 756 shows that the customer can activate the secure payment service for Merchant B with the customer's Accounts Provider A credit card but that the secure payment service for Merchant B is not activated. The fact that the customer can activate the secure payment service for Merchant A and Merchant B, but that the secure payment service is not activated for either Merchant A or Merchant B, is also reflected in rows 720 and 722, respectively, of table 708 shown in FIG. 7A.

As shown in row 758, the secure payment service can also be activated for Merchant C with the customer's checking account, though the secure payment service is not activated. However, the secure payment service for Merchant C has been activated with the customer's Accounts Provider A credit card. For example, in some arrangements, the secure payment service for Merchant C has been activated with the customer's Accounts Provider A credit card because the secure payment service was automatically activated for Merchant C with the customer's Accounts Provider A credit card (e.g., when Merchant C was added to the table 742) and the customer never deactivated the secure payment service. Alternatively, in other arrangements, the secure payment service for Merchant C is activated with the customer's Accounts Provider A credit card because the customer activated the secure payment service (e.g., by toggling the button shown in sub-column 752 for row 758 from "Not Activated" to "Activated"). Similarly, row 760 shows that the secure payment service for Merchant D can only be activated with the customer's Accounts Provider A credit card and has been activated for Merchant D with the customer's Accounts Provider A credit card.

Row 762 shows that the customer can only activate the secure payment service for the Auction Website with the customer's Accounts Provider A credit card but that the secure payment service has not been activated for the Auction Website. Conversely, as shown in row 764, the customer can only activate the secure payment service for the Utilities Company using the customer's checking account, and the secure payment service has been activated for the Utilities Company. The fact that the secure payment service has not been activated for the Auction Website but has been activated for the Utilities Company is also reflected in rows 728 and 730, respectively, of table 708 shown in FIG. 7A.

Those of skill in the art will appreciate, however, that FIGS. 7A and 7B illustrate example embodiments of graphical user interfaces presented to a customer as part of displaying a list of third parties likely storing the customer's payment information, as well as actions the customer can take regarding the customer's stored payment information, and displaying a list of enrolled third parties for which the customer can activate/deactivate the secure payment service. Moreover, in certain embodiments, additional or alternative graphical user interfaces are presented to the user as part of displaying a list of third parties likely storing the customer's payment information and/or displaying a list of enrolled third parties for which the customer can activate/deactivate the secure payment service.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

The "circuit" may also include one or more processors communicatively coupled to one or more memories or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be understood that a "network interface circuit," as used herein, includes any of a cellular transceiver Code Division Multiple Access (CDMA), Global System for Mobile Communications (GSM), Long-Term Evolution (LTE), etc.), a wireless network transceiver (e.g., 802.11X, ZigBee, or Bluetooth), or a combination thereof (e.g., both a cellular transceiver and a Bluetooth transceiver). In some arrangements, a network interface circuit includes hardware and machine-readable media sufficient to support communication over multiple channels of data communication. Further, in some arrangements, the network interface circuit includes cryptography capabilities to establish a secure or relatively secure communication session between the device including the network interface and other devices of the environment 100 via the network 104. In this regard, personal information about clients, payment data, and other types of data is encrypted and transmitted to prevent or substantially prevent the threat of hacking.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions, and arrangement of the embodiments without departing from the scope of the present disclosure as expressed in the appended claims.

What is claimed is:

1. A computer-implemented method performed by a computing system, the method comprising:
    gathering payment history data for a payment account, held by a customer with an accounts provider, by data mining the payment history data from a database associated with the accounts provider, wherein the payment account is associated with payment information;
    identifying a subset of the payment history data that relates to online payments;
    analyzing the subset of the payment history data to identify characteristics of the online payments made from the payment account;
    based on the characteristics, determining one or more third parties that are likely storing the payment information including a complete account number for fulfilling payment of a future transaction;
    displaying a list of the one or more third parties to the customer;
    updating the payment information associated with the payment account;
    automatically transmitting, in response to updating, the updated payment information to one or more of the third parties, to cause the one or more of the third parties to update the payment information stored for the customer with the updated payment information to fulfill payment of the future transaction;
    receiving, from a third party, a payment request initiated by the customer, the payment request associated with a transaction between the customer and the third party, wherein the customer has activated, for the third party, the secure payment service for the payment account;
    generating a one-time use token associated with the payment account;
    transmitting the one-time use token to the third party; and processing a payment from the payment account to the third party using the one-time use token, wherein processing the payment comprises:
  receiving the one-time use token from the third party;
  decoding the one-time use token to identify the payment account; and
changing an account balance of the payment account to reflect an amount of the payment.

2. The method of claim 1, wherein the characteristics comprise at least one of frequencies of payments, timings of payments, amounts of payments, methods of payments, or identities of payment recipients.

3. The method of claim 1, wherein the third party is one of the one or more third parties that are likely storing the payment information.

4. A system comprising:
a network interface;
an accounts database configured to store account information; and
one or more processors configured for:
  gathering payment history data for a payment account, held by a customer with an accounts provider, by screen scraping the payment history data, wherein the payment account is associated with payment information;
  identifying a subset of the payment history data that relates to online payments;
  analyzing the subset of the payment history data to identify characteristics of the online payments made from the payment account;
  based on the characteristics, determining one or more third parties that are likely storing the payment information including a complete account number for fulfilling payment of a future transaction;
  displaying a list of the one or more third parties to the customer;
  updating the payment information associated with the payment account;
  receiving, from the customer, a request to transmit the updated payment information to one or more of the third parties;
  transmitting, in response to the request, the updated payment information to one or more of the third parties, to cause the one or more of the third parties to update the payment information stored for the customer with the updated payment information to fulfill payment of the future transaction;
  receiving, from a third party, a payment request initiated by the customer, the payment request associated with a transaction between the customer and the third party, wherein the customer has activated, for the third party, the secure payment service for the payment account;
  generating a one-time use token associated with the payment account;
  transmitting the one-time use token to the third party; and
  processing a payment from the payment account to the third party using the one-time use token, wherein processing the payment comprises:
    receiving the one-time use token from the third party;
    decoding the one-time use token to identify the payment account; and
    changing an account balance of the payment account to reflect an amount of the payment.

5. The system of claim 4, wherein the characteristics comprise at least one of frequencies of payments, timings of payments, amounts of payments, methods of payments, or identifies of payment recipients.

6. The system of claim 4, wherein the third party is one of the one or more third parties that are likely storing the payment information.

7. A computer-implemented method performed by a computing system, the method comprising:
gathering payment history data for a payment account held by a customer with an accounts provider, wherein the payment account is associated with payment information;
identifying a subset of the payment history data that relates to online payments;
analyzing the subset of the payment history data to identify characteristics of the online payments made from the payment account;
based on the characteristics, determining one or more third parties that are likely storing the payment information including a complete account number for fulfilling payment of a future transaction;
displaying a list of the one or more third parties to the customer;
updating the payment information associated with the payment account;
transmitting the updated payment information to one or more of the third parties that are likely storing the payment information, to cause the one or more of the third parties to update the payment information stored for the customer with the updated payment information to fulfill payment of the future transaction;
receiving, from the customer, a request to enroll a third party in a secure payment service corresponding to the payment account;
receiving, from the third party, a payment request initiated by the customer, the payment request associated with a transaction between the customer and the third party;
generating a one-time use token associated with the payment account;
transmitting the one-time use token to the third party; and
processing a payment from the payment account to the third party using the one-time use token, wherein processing the payment comprises:
  receiving the one-time use token from the third party;
  decoding the one-time use token to identify the payment account; and
  changing an account balance of the payment account to reflect an amount of the payment.

8. The method of claim 7, further comprising:
receiving, from the customer, a request to transmit the updated payment information to one or more of the third parties;
wherein transmitting the updated payment information is responsive to the customer request.

9. The method of claim 7, wherein the updated payment information is automatically transmitted to the one or more of the third parties in response to the updating of the payment information.

10. The method of claim 7, wherein gathering the payment history data comprises data mining the payment history data from a database associated with the accounts provider.

11. The method of claim 7, wherein gathering the payment history data comprises screen scraping the payment history data from a device of the customer.

* * * * *